United States Patent
Clarkson

(10) Patent No.: US 9,377,859 B2
(45) Date of Patent: Jun. 28, 2016

(54) ENHANCED DETECTION OF CIRCULAR ENGAGEMENT GESTURE

(75) Inventor: Ian Clarkson, Ottawa (CA)

(73) Assignee: Qualcomm Incorporated, San Diego, CA (US)

(*) Notice: Subject to any disclaimer, the term of this patent is extended or adjusted under 35 U.S.C. 154(b) by 675 days.

(21) Appl. No.: 13/399,757

(22) Filed: Feb. 17, 2012

(65) Prior Publication Data
US 2012/0151421 A1    Jun. 14, 2012

Related U.S. Application Data

(63) Continuation of application No. 12/508,637, filed on Jul. 24, 2009, now Pat. No. 8,146,020.

(60) Provisional application No. 61/083,461, filed on Jul. 24, 2008.

(51) Int. Cl.
| | |
|---|---|
| *G06F 3/01* | (2006.01) |
| *G06K 9/32* | (2006.01) |
| *G06K 9/00* | (2006.01) |
| *G06F 17/30* | (2006.01) |
| *G06T 7/20* | (2006.01) |

(52) U.S. Cl.
CPC .......... *G06F 3/017* (2013.01); *G06F 17/30811* (2013.01); *G06K 9/00026* (2013.01); *G06K 9/00355* (2013.01); *G06K 9/3241* (2013.01); *G06T 7/2006* (2013.01)

(58) Field of Classification Search
CPC ............. G06F 3/00; G06F 3/005; G06F 3/01; G06F 3/011; G06F 3/014; G06F 3/017; G06F 3/04883; G06F 17/30811; G06K 9/00355; G06K 9/3241; G06K 9/00026; G06T 7/2006

USPC ............................ 715/863; 382/103, 154, 187
See application file for complete search history.

(56) References Cited

U.S. PATENT DOCUMENTS

| | | | |
|---|---|---|---|
| 5,452,371 A | | 9/1995 | Bozinovic et al. |
| 5,454,043 A | * | 9/1995 | Freeman ...................... 382/168 |
| 5,523,775 A | | 6/1996 | Capps |

(Continued)

FOREIGN PATENT DOCUMENTS

| | | | |
|---|---|---|---|
| JP | 2001111881 A | | 4/2001 |
| JP | 2003316510 A | | 11/2003 |

(Continued)

OTHER PUBLICATIONS

Bobick et al. The Recognition of Human Movement Using Temporal Templates, IEEE Transactions on Pattern Analysis and Machine Intelligence, vol. 23, No. 3, Mar. 2001. pp. 257-267.*

(Continued)

*Primary Examiner* — Amy M Levy
(74) *Attorney, Agent, or Firm* — Kilpatrick Townsend & Stockton LLP

(57) ABSTRACT

The enhanced detection of a circular engagement gesture, in which a shape is defined within motion data, and the motion data is sampled at points that are aligned with the defined shape. It is determined whether a moving object is performing a gesture correlating to the defined shape based on a pattern exhibited by the sampled motion data. An application is controlled if determining that the moving object is performing the gesture.

31 Claims, 16 Drawing Sheets

(56) References Cited

U.S. PATENT DOCUMENTS

| | | | |
|---|---|---|---|
| 5,594,469 A * | 1/1997 | Freeman et al. | 345/158 |
| 5,687,254 A | 11/1997 | Poon et al. | |
| 5,781,663 A * | 7/1998 | Sakaguchi et al. | 382/189 |
| 6,002,808 A * | 12/1999 | Freeman | 382/288 |
| 6,072,494 A * | 6/2000 | Nguyen | 715/863 |
| 6,160,899 A | 12/2000 | Lee et al. | |
| 6,204,852 B1 * | 3/2001 | Kumar et al. | 345/419 |
| 6,215,890 B1 | 4/2001 | Matsuo et al. | |
| 6,222,465 B1 * | 4/2001 | Kumar et al. | 341/20 |
| 6,252,598 B1 * | 6/2001 | Segen | 715/863 |
| 6,256,033 B1 * | 7/2001 | Nguyen | 715/863 |
| 6,256,400 B1 | 7/2001 | Takata et al. | |
| 6,424,370 B1 * | 7/2002 | Courtney | 348/143 |
| 6,574,266 B1 | 6/2003 | Haartsen | |
| 6,984,208 B2 | 1/2006 | Zheng | |
| 7,129,927 B2 | 10/2006 | Mattsson | |
| 7,308,112 B2 | 12/2007 | Fujimura et al. | |
| 7,340,077 B2 | 3/2008 | Gokturk et al. | |
| 7,460,690 B2 | 12/2008 | Cohen et al. | |
| 7,598,942 B2 | 10/2009 | Underkoffler et al. | |
| 7,721,207 B2 | 5/2010 | Nilsson | |
| 7,877,707 B2 | 1/2011 | Westerman et al. | |
| 8,007,110 B2 | 8/2011 | Dunn et al. | |
| 8,146,020 B2 | 3/2012 | Clarkson | |
| 8,180,368 B2 | 5/2012 | Anderson et al. | |
| 8,737,693 B2 | 5/2014 | Clarkson | |
| 2002/0041327 A1 | 4/2002 | Hildreth et al. | |
| 2002/0064382 A1 | 5/2002 | Hildreth et al. | |
| 2002/0118880 A1 * | 8/2002 | Liu | G06K 9/00335 382/199 |
| 2002/0181773 A1 * | 12/2002 | Higaki et al. | 382/190 |
| 2003/0058111 A1 * | 3/2003 | Lee et al. | 340/573.1 |
| 2003/0138130 A1 * | 7/2003 | Cohen et al. | 382/103 |
| 2003/0156756 A1 * | 8/2003 | Gokturk et al. | 382/190 |
| 2003/0167908 A1 | 9/2003 | Nishitani et al. | |
| 2004/0001544 A1 * | 1/2004 | Mehrotra | H04N 5/145 375/240.1 |
| 2004/0193413 A1 | 9/2004 | Wilson et al. | |
| 2005/0196015 A1 | 9/2005 | Luo et al. | |
| 2006/0010400 A1 | 1/2006 | Dehlin et al. | |
| 2006/0098873 A1 | 5/2006 | Hildreth et al. | |
| 2006/0210112 A1 * | 9/2006 | Cohen et al. | 382/103 |
| 2006/0281453 A1 | 12/2006 | Jaiswal et al. | |
| 2007/0124702 A1 | 5/2007 | Morisaki | |
| 2008/0030460 A1 * | 2/2008 | Hildreth et al. | 345/156 |
| 2008/0141181 A1 | 6/2008 | Ishigaki et al. | |
| 2008/0166022 A1 * | 7/2008 | Hildreth | 382/107 |
| 2009/0027337 A1 | 1/2009 | Hildreth | |
| 2009/0073117 A1 * | 3/2009 | Tsurumi et al. | 345/158 |
| 2009/0183193 A1 * | 7/2009 | Miller, IV | 725/10 |
| 2010/0027846 A1 * | 2/2010 | Xu et al. | 382/107 |
| 2010/0040292 A1 | 2/2010 | Clarkson | |
| 2010/0211902 A1 | 8/2010 | Unsworth et al. | |

FOREIGN PATENT DOCUMENTS

| | | |
|---|---|---|
| JP | 2004157994 A | 6/2004 |
| JP | 2004171476 A | 6/2004 |
| JP | 2007172577 A | 7/2007 |
| JP | 2007189664 A | 7/2007 |
| JP | 2008052590 A | 3/2008 |

OTHER PUBLICATIONS

Hu. Visual Pattern Recognition by Moment Invariants, IRE Trans. Information Theory, vol. 8, No. 2, 1962, pp. 179-187.*

Montiel et al. Efficient validation of matching hypotheses using Mahalanobis distance. Engineering Applications of Artificial Intelligence 11 (1998). pp. 439-448.*

Joy, Ken. On-Line Computer Graphics Notes, retrieved from http://www.idav.ucdavis.edu/education/GraphicsNotes/Bounding-Box/Bounding-Box.html, © 1996, 1997, 1998, 1999.*

International Search Report and Written Opinion—PCT/US2009/051688—ISA—Sep. 15, 2009.

International Search Report and Written Opinion—PCT/US2009/051698—ISA—Sep. 3, 2009.

Nisikawa A, "Recognition of Human Gestures from Optical Flow Based on a Correlation Method Between Local Image Regions", IPSJ Journal, Japan, Information Processing Society of Japan, Aug. 15, 1999, vol. 40(8), 3118-3133.

* cited by examiner

US 9,377,859 B2

ENHANCED DETECTION OF CIRCULAR ENGAGEMENT GESTURE

CROSS REFERENCE TO RELATED APPLICATIONS

This application is a continuation of U.S. patent application Ser. No. 12/508,637, filed Jul. 24, 2009, entitled "Enhanced Detection of Circular Engagement Gesture," which claims the benefit of U.S. Provisional Patent Application No. 61/083,461, filed Jul. 24, 2008, both of which are incorporated herein by reference in their entirety.

FIELD

The present disclosure generally relates to user input.

BACKGROUND

Cameras have been used to capture images of objects. Techniques have been developed to analyze one or more images of an object present within the one or more images to detect a position of the object. For example, optical flow has been used to detect motion of an object by analyzing multiple images of the object taken successively in time.

SUMMARY

According to one general implementation, motion history data for a moving object is generated or otherwise obtained, and motion history values for adjacent points that define a shape within this motion history data (such as a circular shape) are sampled at a particular time. If a generally sloping or stepped pattern is exhibited by the motion history data when the values are plotted in sequence for adjacent sampling points on a graph, the object may be determined to be moving in a gesture corresponding to the shape (i.e. a circular gesture). In doing so, enhanced gesture detection or recognition may be performed based on using motion history data at a single snapshot in time, allowing for improved user input.

According to another general implementation, a computer-readable medium is encoded with a computer program including instructions that, when executed, operate to cause a computer to perform operations including defining a shape within motion data, and sampling the motion data at points that are aligned with the defined shape. The operations also include determining whether a moving object is performing a gesture correlating to the defined shape based on a pattern exhibited by the sampled motion data, and controlling an application if determining that the moving object is performing the gesture.

Implementations may include one or more of the following features. For example, the motion data may include a motion history map further comprising motion history data values that provide, for each point of an image, an indication of time since the moving object was detected at the point. The operations may further include accessing the image, and generating the motion history data values included in the motion history map based on the accessed image. The motion history map may be generated using optical flow. The moving object may be determined not to be performing the gesture if, at a particular time, more than a predetermined quantity of consecutive points that are aligned with the defined shape comprise a same sampled motion history data value. The pattern may include a consistently upward or consistently downward sloping or stepped shape on a graph of the motion history data values for consecutive points that are aligned with the defined shape, at a particular time.

In further examples, the operations include determining, for each point, whether the moving object has been detected within a predetermined period of time, and grouping adjacent points determined to have detected motion of the moving object within the predetermined period of time, where the motion data may be sampled at a subset of the grouped points that are aligned with the defined shape. A center of the shape may be defined at a centroid, a center of mass, or a median pixel of the grouped points. The operations may further include defining a bounding box around the grouped points, where a size and a location of the shape within the motion data are defined with respect to the bounding box. The shape may be a circle, and a diameter of the circle may be less than a smaller dimension of the bounding box. The diameter of the circle may be 60% to 70% of the smaller dimension of the bounding box.

In additional examples, a center of the shape may be aligned within the bounding box according to a function of a dimension or an aspect ratio of the bounding box. If the bounding box is square-shaped, a center of the shape may be defined at a center of the bounding box. If a height h of the bounding box is greater than a width w of the bounding box, a center of the shape may be horizontally aligned with w/2 and may be vertically aligned with (h−w/2) with respect to a bottom left corner of the bounding box. If a width w of the bounding box is greater than a height h of the bounding box, a center of the shape may be horizontally aligned with w/2, and may be vertically aligned with h/2 with respect to a bottom left corner of the bounding box.

In other examples, the gesture may be a single stroke shape, such as a circle shape, a figure-eight-shape, or an infinity-shape. The operations may also include detecting groups of points within the motion data, and selecting one of the groups of points, where the shape may be defined within the one selected group. The one group may be selected based on relative size. The motion data may be sampled at a sampled quantity of points that are aligned with the defined shape, and the sampled quantity may include a fixed quantity or may be based on a size of the defined shape or an aligned quantity of points that are aligned with the defined shape within the motion data. The motion data may be sampled at a first quantity of points aligned with the defined shape and, if determining that the moving object is performing the gesture, the application may be controlled based on sampling a second, lesser quantity of the points aligned with the defined shape.

In another general implementation, a computer-implemented process includes defining a shape within motion data, and sampling the motion data at points that are aligned with the defined shape. The process also includes determining whether a moving object is performing a gesture correlating to the defined shape based on a pattern exhibited by the sampled motion data, and controlling an application if determining that the moving object is performing the gesture.

In a further general implementation, a device includes a processor configured to define a shape within motion data, and to sample the motion data at points that are aligned with the defined shape. The processor may be further configured to determine whether a moving object is performing a gesture correlating to the defined shape based on a pattern exhibited by the sampled motion data, and to control an application if determining that the moving object is performing the gesture.

Implementations of any of the techniques described above may include a method, a process, a system, a device, an apparatus, an interaction interface, instructions stored on a computer-readable medium, or a computer-readable medium encoded with a computer program. The details of one or more implementations are set forth in the accompanying drawings and the description below. Other features will be apparent from the description and drawings, and from the claims.

DETAILED DESCRIPTION

Figure 1:
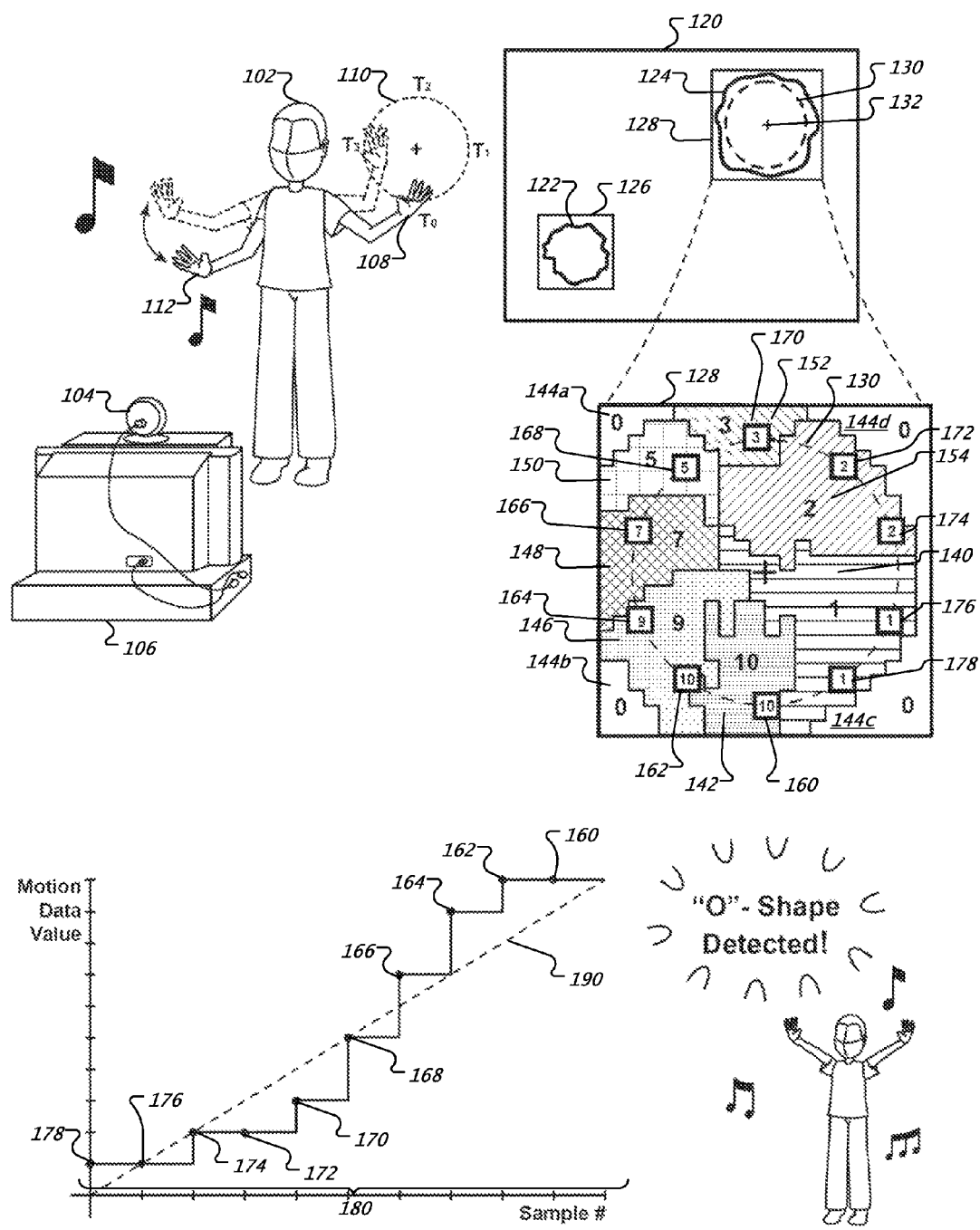
FIG. 1 is a contextual diagram demonstrating gesture recognition.

According to one general implementation, motion history data for a moving object is generated or otherwise obtained, and motion history values for adjacent points that define a shape within this motion history data (such as a circular shape) are sampled at a particular time. If a generally sloping or stepped pattern is exhibited by the motion history data when the values are plotted in sequence for adjacent sampling points on a graph, the object may be determined to be moving in a gesture corresponding to the shape (i.e. a circular gesture). In doing so, enhanced gesture detection or recognition may be performed based on using motion history data at a single snapshot in time, allowing for improved user input.

Instead of selecting a control on a user interface, a user may move through a series of motions that define a gesture (e.g., move their hand or other body part), in order to invoke certain functionality that is associated with that gesture. As such, functions may be implemented without requiring the use of physical buttons or user interface controls, allowing smaller user interfaces and effecting increased accuracy in functionality selection. Furthermore, by using camera-based input, the deleterious blurring effect of fingerprints on a touchscreen is eliminated, since the user is not required to physically touch any device in order to effect a control input.

Thus, in one example, a user interacts with a device by performing a set of defined gestures. An enhanced approach is provided, in which an input gesture is either recognized or rejected based on whether motion data sampled at points aligned with a shape defined within the motion data exhibits an expected pattern.

As used herein throughout, a "gesture" is intended to refer to a form of non-verbal communication made with part of a human body, and is contrasted with verbal communication such as speech. For instance, a gesture may be defined by a movement, change or transformation between a first position, pose, or expression and a second pose, position or expression. Common gestures used in everyday discourse include for instance, an "air quote" gesture, a bowing gesture, a curtsey, a cheek-kiss, a finger or hand motion, a genuflection, a head bobble or movement, a high-five, a nod, a sad face, a raised fist, a salute, a thumbs-up motion, a pinching gesture, a hand or body twisting gesture, or a finger pointing gesture.

A gesture may be detected using a camera (e.g. a time-of flight camera), such as by analyzing an image of a user; using a tilt sensor, such as by detecting an angle that a user is holding or tilting a device, sensing motion of a device; or by any other approach. Gestures may be formed by performing a series of motions in a particular pattern or fashion.

Although the enhanced approach described herein is described using an example circular gesture, in other implementations any other shape or type of gesture (such as the example gestures described above) may be detected as well. Furthermore, although the example circle gesture is described as being an "engagement" gesture, in other implementations a gesture detected using this enhanced approach has a purpose other than being an "engagement gesture." Further description of an "engagement" gesture (as opposed to a gesture intended to define an actual command input) is described in further detail below.

A user may make a gesture (or may "gesture" or "gesticulate") by changing a position of a body part (e.g. a waving motion), or a user may gesticulate without changing a position of a body part (e.g. by making a clenched fist gesture, or by holding a body part immobile for a period of time). Although the enhanced approach uses, as examples, finger, hand and arm gestures, other types of gestures may also be used. For example, if the motion of a user's eye is tracked, the enhanced approach described herein may be used to detect a circular "eye roll" gesture.

FIG. 1 is a contextual diagram demonstrating gesture recognition. A user 102 is standing in front of a camera 104 and a media hub 106. The media hub 106 may be, for example, a computer which is playing a musical recording. The user 102 moves their left hand 108 in a circular motion, creating a circular shape 110. At a time point $t_0$, the user's hand 108 is at the bottom of the circle 110, at a time point $t_1$ the user's hand 108 is on the right side of the circle 110 (from the reader's perspective), at a time point $t_2$ the user's hand 108 is at the top of the circle 110, and at a time point $t_3$ the user's hand 108 is at the left side of the circle 110. While the user 102 performs an intentional gesture (such as the circle 110) with his left hand 108, the user 102 may make other, intentional or unintentional movements, such as a wiggle or small movement of a right hand 112. This small movement of the right hand 112 may be caused by body jitter, or even movement of the camera 104 itself.

The camera 104 may take multiple images of the user 102 as time elapses. The media hub 106 may process the multiple images and generate a motion history map 120, which may indicate a user's motion over time. The motion history map 120 may provide motion data, which includes, for each point of an image, an indication of time since a moving object was detected at the point. The media hub 106 may determine, for each point in an image, whether a moving object (e.g., the hand 108) has been detected within a predetermined period of time.

Although the motion history map 120 is illustrated as a visual grid of points, the motion history map 120 may exist purely as a data structure on a computer-readable medium, without a concomitant visualization. When visualized, however, points on the motion history map 120 may appear as bright spots (representing high values) where recent motion was detected, fading over time to black as time elapses without the occurrence of additional motion. At a particular moment in time, for example, a swiping hand motion may appear as a bright spot where the user's hand is detected most recently, followed by a trail which fades to black where the swiping hand motion began.

Adjacent points on the motion history map that have experienced recent motion may be grouped for processing as a single group, cluster or "blob." By processing the points as a group instead of processing each point individually, computational expense may be minimized. Points determined to have motion as a result of the movement of the right hand 112 may be grouped as a group of points 122. As another example, points determined to have motion as a result of the circular movement of the left hand 108 may be grouped as a group of points 124.

For each group of points, a bounding box may be defined around the group. For example, a bounding box 126 is defined around the group of points 122 and a bounding box 128 is defined around the group of points 124. If the user starts performing a gesture while their hand is already in an upright position, the bounding box may be generally square shaped. If the user starts performing the gesture while their hand is at their side, the lifting of the hand from their side to the upright position may cause the bounding box to be shaped as a tall rectangle. By decreasing the persistence of the motion history (e.g. increasing the fade rate of the motion history values for each pixel), the effect of this hand lifting motion can be reduced, resulting in bounding boxes which are more square shaped than they are rectangular for the performance of a typical circular gesture.

Intentional movements, such as the movement caused by the circular motion of the hand 108, may result in a larger grouping of points than unintentional movements, such as the movement caused by the wiggle of the hand 112. For example, the group of points 124 is larger than the group of points 122. In some implementations, for purposes of gesture detection, only the largest group of points may be considered as associated with a candidate gesture. In other approaches, however, the smaller group of points will be considered first, the groups of points will each be considered at the same time, or the groups will each be considered in turn based on size or other criteria. Furthermore, each group may be examined at the same time, in parallel.

A shape may be inscribed or otherwise defined inside of the motion data, where the size and location of the shape are defined with respect to a bounding box. For example, a circle 130 may be inscribed inside the bounding box 128 (e.g., inside the bounding box surrounding the largest group of points). As described below, motion data may be sampled using points that are aligned with the circle 130. The diameter of the circle 130 may be based on the size of the bounding box 128. For example, the diameter of the circle 130 may be 60% of the length of the smaller dimension of the bounding box 128.

If the bounding box 128 is square-shaped, the center 132 of the circle 130 may be defined at the center of the bounding box 128. If the bounding box 128 is not square-shaped, the center of the circle 130 may be aligned within the bounding box 128 according to a function of a dimension or an aspect ratio of the bounding box 128, for example to be closer to the top, bottom, right, or left of the bounding box than the center. Assuming that positive X and Y values represent "up" and "to the right," respectively, the center of the circle 130 may be defined at a point with an X coordinate equal to half the width of the bounding box 128 and a Y coordinate equal to the height of the bounding box 128 minus half the width of the bounding box 128, relative to the lower left corner of or any other reference point on the bounding box 128.

The motion history map 120 may include regions of associated motion history data values. Motion history data values may indicate how recently detected motion occurred in a particular region. For example, a region 140 includes points with motion history data values of "1". A value of "1" indicates that motion occurred in that region, but relatively a long time ago, compared to more recent motion detected in a region 142, where points within the region 142 have motion history data values of "10". If a scale of 1 to 10 is used for a motion history map, a value of "10" indicates most recent motion and a value of "1" (or a value near "0") indicates least-recent motion. Regions 144a-d include motion history data values of "0", indicating that no motion has been detected in those regions recently. Other scales may be used, such as a scale from "0" to "255".

As mentioned above, the motion history data values within the bounding box 128 correspond to the circular motion of the user's left hand 108. The most recent motion occurs at the bottom of the circular gesture, corresponding to the region 142 (note that the shape of the region 142 resembles a hand). If the regions in the bounding box 128 are examined in a clockwise direction (again, from the reader's perspective), it becomes apparent that the regions have decreasing motion history data values, (i.e., a pattern of most-recent to least-recent values occurs in a clockwise direction). For example, as mentioned, the region 142 has values of "10." A region 146 has values of "9," a region 148 has values of "7," a region 150 has values of "5," a region 152 has values of "3," a region 154 has values of "2," and, as mentioned, the region 140 has values of "1."

The actual values exhibited by a region will depend upon the persistence (or fade rate) of each pixel as well as the speed of the object. For example, for a given persistence and assuming motion history values between "1" and "10", a very slow (e.g. perhaps too slow) moving hand may only generate a single region with a value of "10." A faster, but still slow moving hand may generate ten different regions each with different values starting at "10" for the region where the gesture ended, fading to a value of "1" for the region where the gesture started. A faster moving hand may create a lesser number of regions, such as a first region with a value of "10" and a second region with a value of "9". A hand moving extremely fast may create one region only (with a value of "10").

The enhanced approach described herein may use application-specific or user-specific settings, which may be adjustable, in order to determine whether a given gesture is accepted or rejected. Included in these settings, for example, may be directionality, timing and sequencing criteria which may be applied to the patterns exhibited by sampled motion history data. Depending upon the particular settings chosen, it may be that none (or all) of the above hand motions may be accepted or rejected as "true" circular gestures.

As noted above, motion data may be sampled using points that are aligned with the circle 130. The sampled quantity may be a fixed quantity (e.g., 3, 64, or 10,000 samples), or the sampled quantity may be based on the size of the circle 130 (e.g., a larger circle may result in more sample points than a smaller circle). For example, sample points 160-178 may be considered. The sample points 160 and 162 are within the region 142 and have a value of "10." The sample point 164 is within the region 146 and has a value of "9." The sample point 166 is within the region 148 and has a value of "7." The sample point 168 is within the region 150 and has a value of "5." The sample point 170 is within the region 152 and has a value of "3." The sample points 172 and 174 are within the region 154 and have a value of "2." The sample points 176 and 178 are within the region 140 and have a value of "1."

The sample points 160-178 may be plotted on a graph 180, or a line or curve may be fitted to the motion history values associated with the sample points 160-178. The graph 180 displays motion data values along the Y axis and individual samples (e.g., sample numbers) in sequence along the X axis. If a circular gesture (e.g., 110) has been performed, plotting sample points taken along the inscribed circle 130 will result in a generally linear or stepped shape of the graph 180. A line 190 may be fit to the sample points 160-178. Various threshold tests for linearity may be performed, such as ensuring that no more than a threshold number of consecutive values occur, and that the values uniformly increase in one direction. For example, two consecutive "1" values (i.e., 178 and 176) may pass a consecutive-values test using a threshold of "3," while four consecutive "1" values may fail such a consecutive-values test.

If the shape of the graph 180 (e.g., the pattern exhibited by the sampled points 160-178) is determined to be linear, the circular gesture 110 is recognized as a performed gesture. In response to recognizing the circular gesture 110, an application may be controlled. For example, the volume of the music playing on the media hub 106 may be increased. A function to perform in response to a gesture may be determined, for example, by querying a mapping database which maps gestures to functions.

Figure 2:
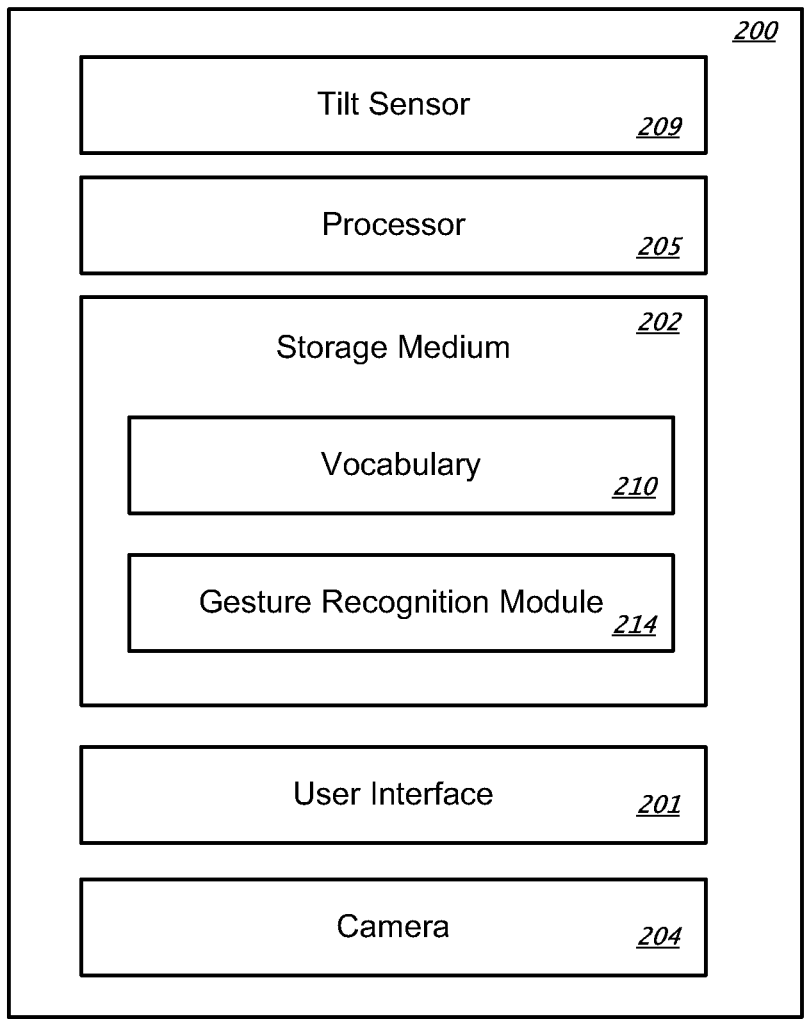
FIG. 2 is a block diagram of a device.

FIG. 2 is a block diagram of a device 200 used to implement gesture recognition. Briefly, and among other things, the device 200 includes a user interface 201, a storage medium 202, a camera 204, a processor 205, and a tilt sensor 209.

The user interface 201 is a mechanism for allowing a user to interact with the device 200, or with applications invoked by the device 200. The user interface 201 may provide a mechanism for both input and output, allowing a user to manipulate the device or for the device to produce the effects of the user's manipulation. The device 200 may utilize any type of user interface 201, such as a graphical user interface (GUI), a voice user interface, or a tactile user interface.

The user interface 201 may be configured to render a visual display image. For example, the user interface 201 may be a monitor, a television, a liquid crystal display (LCD), a plasma display device, a projector with a projector screen, an auto-stereoscopic display, a cathode ray tube (CRT) display, a digital light processing (DLP) display, or any other type of display device configured to render a display image. The user interface 201 may include one or more display devices. In some configurations, the user interface 201 may be configured to display images associated with an application, such as display images generated by an application, including an object or representation such as an avatar.

The storage medium 202 stores and records information or data, and may be an optical storage medium, magnetic storage medium, flash memory, or any other storage medium type. Among other things, the storage medium is encoded with a vocabulary 210 and a gesture recognition module 214.

The vocabulary 210 includes information regarding gestures that the device 200 may recognize. For example, the vocabulary 210 may include gesture definitions which describe, for each recognized gesture, a shape corresponding to the gesture, a pattern which a graph of motion history data is expected to exhibit if sampled along the shape, along with various threshold parameters or criteria which may be used to control gesture acceptance or rejection.

The gesture recognition module 214 receives motion data captured by a motion sensor (e.g., the camera 204 or the tilt sensor 209) and compares the received motion data to motion data stored in the vocabulary 210 to determine whether a recognizable gesture has been performed. For example, the gesture recognition module may plot motion history data values sampled along a shape inscribed in received motion data and compare the resultant graph to an expected graph stored in the vocabulary 210.

The camera 204 is a device used to capture images, either as still photographs or a sequence of moving images. The camera 204 may use the light of the visible spectrum or with other portions of the electromagnetic spectrum, such as infrared. For example, the camera 204 may be a digital camera, a digital video camera, or any other type of device configured to capture images. The camera 204 may include one or more cameras. In some examples, the camera 204 may be configured to capture images of an object or user interacting with an application. For example, the camera 204 may be configured to capture images of a user or person physically gesticulating in free-space (e.g. the air surrounding the user), or otherwise interacting with an application within the field of view of the camera 204.

The camera 204 may be a stereo camera, a time-of-flight camera, or any other camera. For instance the camera 204 may be an image detector capable of sampling a background image in order to detect motions and, similarly, gestures of a user. The camera 204 may produce a grayscale image, color image, or a distance image, such as a stereo camera or time-of-flight camera capable of generating a distance image. A stereo camera may include two image sensors that acquire images at slightly different viewpoints, where a processor compares the images acquired from different viewpoints to calculate the distance of parts of the images. A time-of-flight camera may include an emitter that generates a pulse of light, which may be infrared light, where the time the pulse of light travels from the emitter to an object and back to a sensor is measured to calculate the distance of parts of the images.

The device 200 is electrically connected to and in operable communication with, over a wireline or wireless pathway, the camera 204 and the user interface 201, and is configured to control the operation of the processor 205 to provide for the enhanced control. In one configuration, the device 200 uses the processor 205 or other control circuitry to execute an application that provides for enhanced camera-based input. Although the camera 204 may be a separate unit (such as a webcam) that communicates with the device 200, in other implementations the camera 204 is built into the device 200, and communicates with other components of the device 200 (such as the processor 205) via an internal bus. For example, the camera 204 may be built into a television or set-top box.

Although the device 200 has been described as a personal computer (PC) or set top box, such a description is made merely for the sake of brevity, and other implementations or manifestations are also contemplated. For instance, the device 200 may be implemented as a television, an ultra-mobile personal computer (UMPC), a mobile Internet device (MID), a digital picture frame (DPF), a portable media player (PMP), a general-purpose or special purpose-computer (e.g., a desktop computer, a workstation, or a laptop computer), a server, a gaming device or console, or any other type of electronic device that includes a processor or other control circuitry configured to execute instructions, or any other apparatus that includes a user interface.

In one example implementation, input occurs by using a camera to detect images of a user performing gestures. For instance, a mobile phone may be placed on a table and may be operable to generate images of a user using a face-forward camera. For example, a detected "clockwise circle" gesture may rotate an image clockwise, and a detected "counter-clockwise" gesture may rotate an image counter-clockwise. Alternatively, the gesture may be recognized or detected using the tilt sensor 209, such as by detecting a "tilt left"

gesture to move a representation left and to pan an image left or rotate an image counter-clockwise, or by detecting a "tilt forward and right" gesture to move a representation up and to the right of a neutral position, to zoom in and pan an image to the right.

The tilt sensor 209 may thus be any type of module operable to detect an angular position of the device 200, such as a gyroscope, accelerometer, or a camera-based optical flow tracker. In this regard, image-based input may be supplemented with or replaced by tilt-sensor input to perform functions or commands desired by a user. Put another way, detection of a user's gesture may occur without using a camera, or without detecting the user within the images. By moving the device in the same kind of stroke pattern as the user desires to manipulate the image on the user interface, the user is enabled to control the same interface or application in a straightforward manner.

Figure 3:
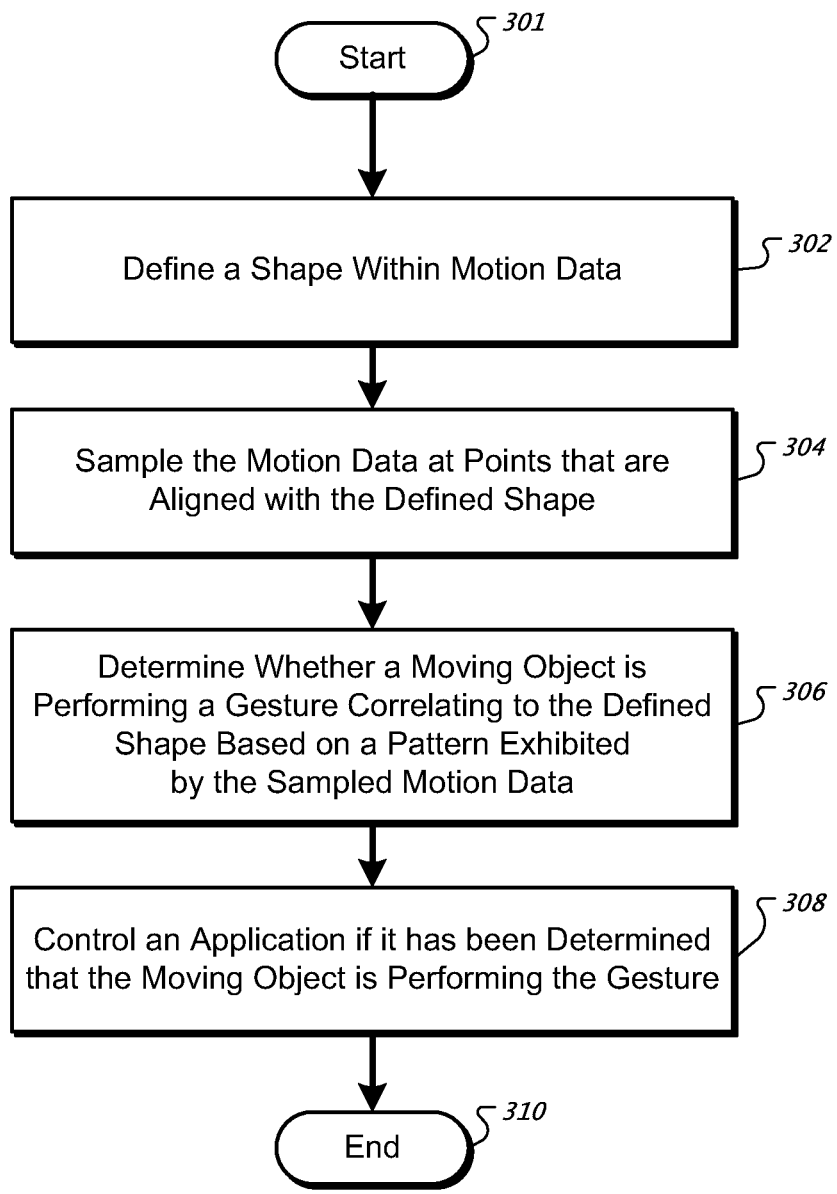
FIG. 3 is a flowchart of an exemplary process.

FIG. 3 is a flowchart illustrating a computer-implemented process 300 that effects functionality invocation in response to recognized gestures. Briefly, the computer-implemented process 300 includes defining a shape within motion data, sampling the motion data at points that are aligned with the defined shape, determining whether a moving object is performing a gesture correlating to the defined shape based on a pattern exhibited by the sampled motion data, and controlling an application if it has been determined ("if determining") that the moving object is performing the gesture.

In further detail, when the process 300 begins (S301), a shape is defined within motion data (S302). Motion data may be provided by a motion history map (e.g., map 120, FIG. 1). The motion history map may be created from multiple images of a user taken over time. The motion history map may indicate a user's motion over time, and may provide motion data, which includes, for each point of an image, an indication of time since a moving object was detected at the point. The shape may be defined within the motion data without visualizing either the shape or the motion data on a user interface.

The motion data may include groups of adjacent points determined to have motion. For each group of points, a bounding box may be defined around the group. Since an intentional gesture may result in a generally larger group of points than an unintentional gesture, in some implementations, for purposes of gesture detection, only the largest group of points may be considered as associated with a candidate gesture.

A shape, such as a circle, may be inscribed or otherwise defined inside of the motion data, where the size and location of the shape may be defined with respect to the largest bounding box. For example, the diameter of an inscribed circle may be 60-70% of the length of the smaller dimension of the bounding box.

Figure 4:
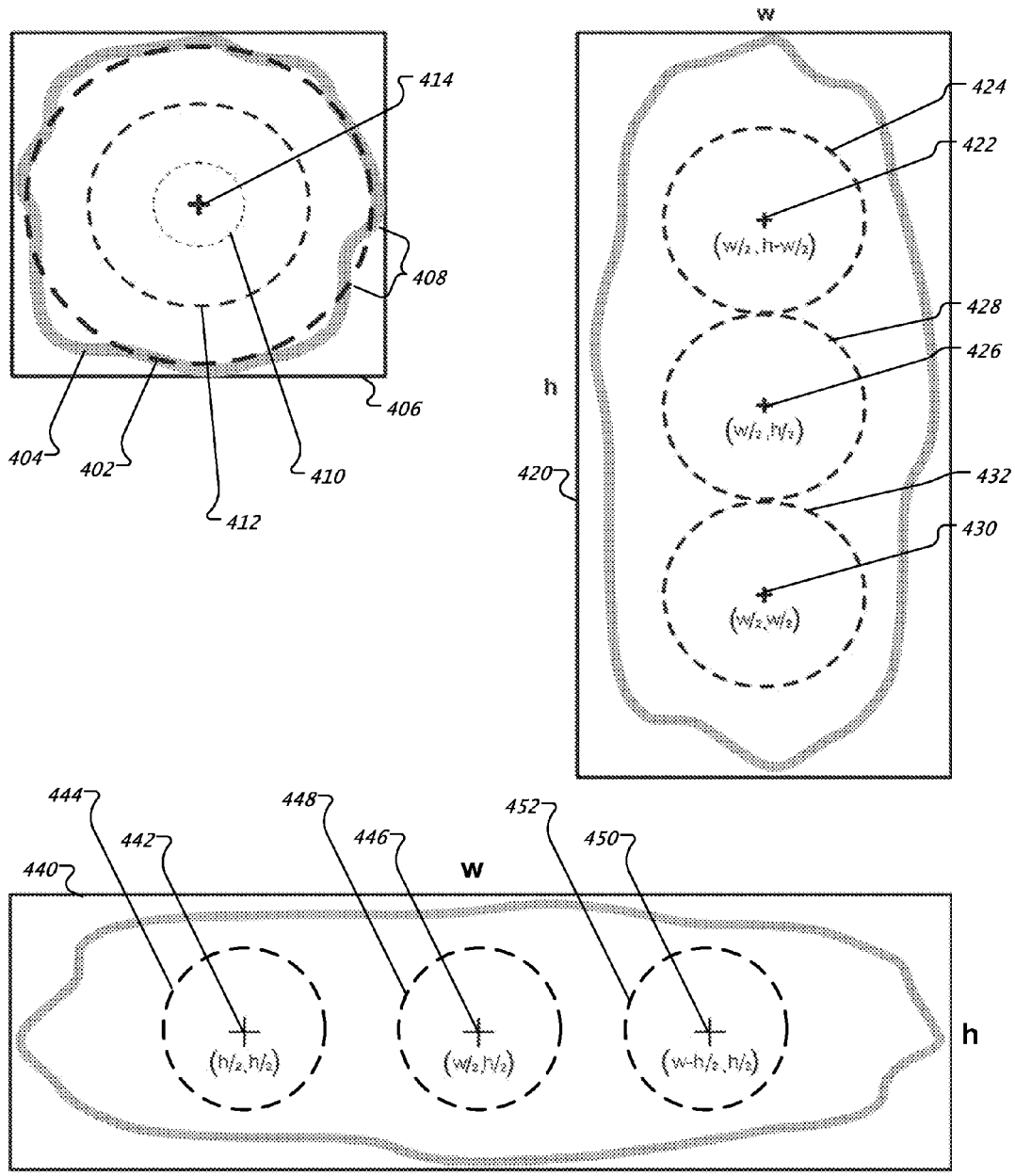
FIG. 4 illustrates inscribed circle sizes and locations.

Using a circle with a diameter of 60-70% of the length of the smaller dimension of the bounding box may have advantages over using a circle with a significantly smaller or larger diameter. For example and as shown in FIG. 4 (which is not drawn to scale), a circle 402 is inscribed inside motion data 404 surrounded by a square bounding box 406. The diameter of the circle 402 is slightly less than (e.g., 95% of) the side length of the bounding box 406. If a large circle such as the circle 402 is used, sections such as a section 408 may appear "outside" of the motion data 404. That is, if a point is sampled along the section 408 of the circle 402, the corresponding motion history data value may be zero. Inconsistent and/or sporadic zero data values may cause inconsistent jumps or gaps in plotted graphs, making pattern comparison difficult or inaccurate, or causing circle gestures to be improperly rejected.

Also, if a small circle 410 is inscribed in the motion data 404, the circle 410 may not cross significant portions of the motion data 404, resulting in a non-representative sampling and possibly inaccurate gesture interpretation. For example, if the circle is too small, gestures that are not in fact circular gestures may be improperly accepted as circular gestures. Using a circle 412, which has a diameter of 60-70% of the side length of the bounding box 406, avoids the "outside of the motion data" problems of the larger circle 402 and the insufficient sampling problems of the smaller circle 410.

A shape may be placed at various locations within a bounding box, for example to be closer to the top, bottom, right, or left of the bounding box than the center. A shape center may be defined at a centroid, a center of mass, or a median pixel of grouped points. If the bounding box is square-shaped (e.g., box 406), the center of the inscribed shape (e.g., circle center) may be defined at the center of the bounding box, as shown, by a center point 414. If the bounding box is not square-shaped, the center of the shape may be aligned within the bounding box according to a function of a dimension or an aspect ratio of the bounding box.

For example and as illustrated by a bounding box 420, if the height h of the bounding box 420 is greater than the width w of the bounding box 420, a center 422 of a circle 424 may be aligned along the X-axis with w/2 and aligned along the Y-axis with (h−w/2), with respect to the bottom left corner of the bounding box 420. Using this approach, the center 422 of a circle 424 would be aligned with respect to both the X and Y axis at w/2, from the perspective of the upper left corner of the bounding box 420.

Returning to the perspective of the bottom left corner of the bounding box 420, other examples include: 1) a center 426 of a circle 428 horizontally aligned with w/2 and vertically aligned with h/2; and 2) a center 430 of a circle 432 horizontally and vertically aligned with w/2. The top left corner, or any other reference point within the bounding box, is used as a reference to determine the location of the defined shape.

As another example, if the width w of a bounding box 440 is greater than the height h of the bounding box 440, a center 442 of a circle 444 may be horizontally and vertically aligned with h/2, with respect to the bottom left corner of the bounding box 440. Other examples include: 1) a center 446 of a circle 448 horizontally aligned with w/2 and vertically aligned with h/2; and 2) a center 450 of a circle 452 horizontally aligned with (w−h/2) and vertically aligned with h/2.

Returning to FIG. 3, when a shape has been defined, the motion data is sampled at points that are aligned with the defined shape (S304). For example, sample points may be aligned along the edge of an inscribed circle. The sampled quantity may be a fixed quantity (e.g., 1000 samples), or the sampled quantity may be based on the size of the shape (e.g., a larger shape may result in more sample points than a smaller shape). The sampled points may be spaced at a fixed and/or predetermined distance apart from each other. In some implementations, after a particular gesture has been recognized at least once, smaller sample sizes may be used, so as to require less physical movement of the user to effect larger inputs into the application. Put another way, reducing the number of sampling points may effect an acceleration or increased sensitivity to motions of the user.

When the motion data is sampled, it is determined whether a moving object is performing a gesture correlating to the defined shape (S306) based on a pattern exhibited by the sampled motion data. For example, sampled motion data corresponding to motion of a hand may be plotted on a graph (e.g., graph 180, FIG. 1). The graph may show, for each sampled point, a motion history data value which indicates how recently detected motion occurred at that point. The shape of the graph may be compared to patterns of graph shapes that are expected to occur when certain defined gestures are performed. For example, a linear pattern may be expected as a result of the performance of a circular gesture.

Figure 5:
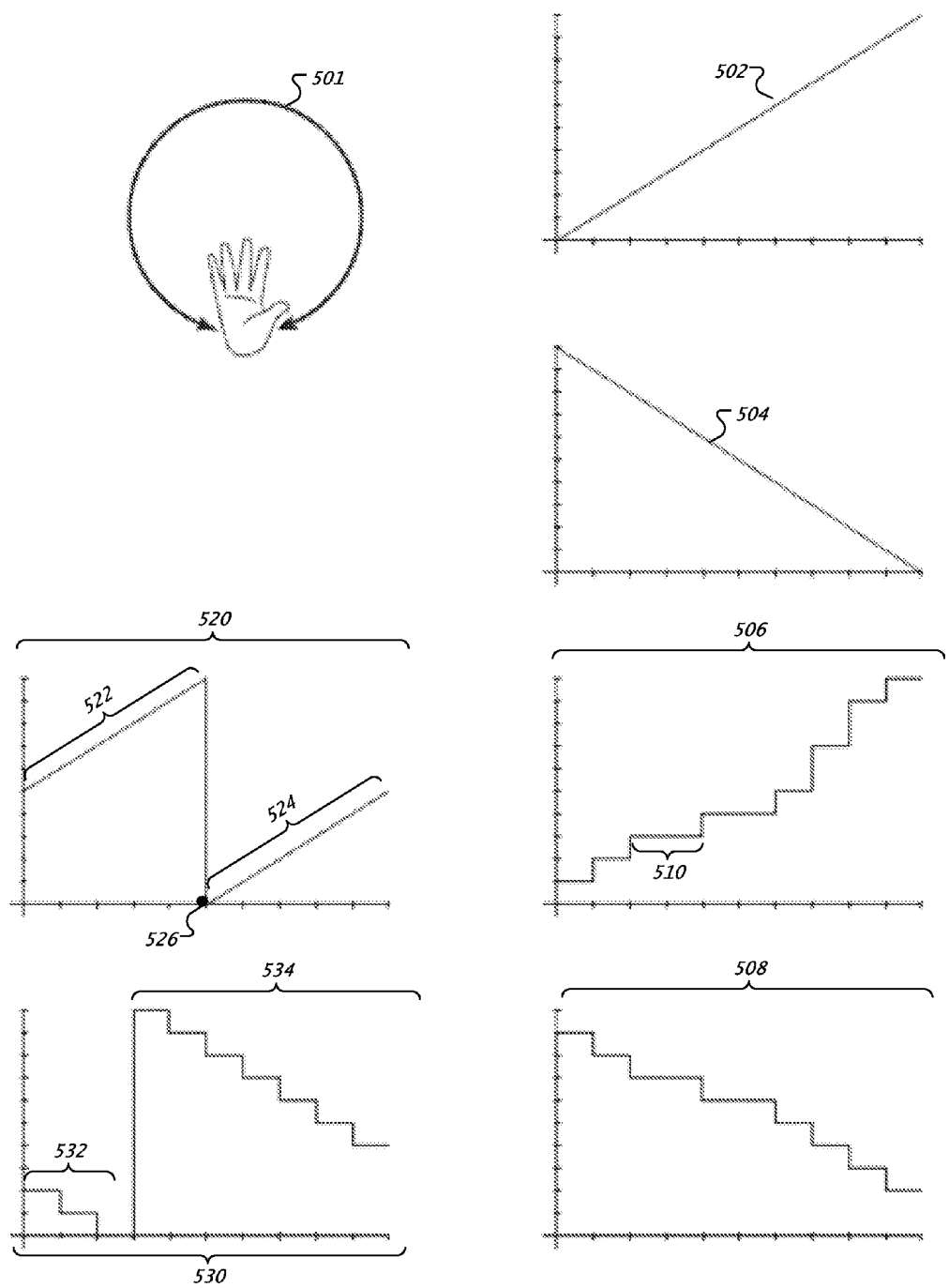
FIGS. 5-7 illustrate example motion history graphs.

For example and as shown in FIG. 5, a linear pattern resulting from the performance of a circular gesture 501 may be manifested as a consistently upward sloped shape 502, a consistently downward sloped shape 504, a consistently upward stepped shape 506, or a consistently downward stepped shape 508, to name a few examples. Stepped shapes may have consecutive points which have the same motion history data value, where the stepped shape (versus a linear shape) may be caused by the fact that the motion history data is not infinitely sampled. The stepped shape 506 includes a section 510 which includes multiple consecutive values. As used herein, "consistently" refers to the quality of always moving (or of almost always moving, if a threshold is set) in the same direction.

Various threshold tests may be performed on the sampled data in order to determine whether a gesture has been performed, such as ensuring that no more than a threshold number of consecutive values occur, and that the values uniformly increase in one direction. The moving object (e.g., a hand) may be determined not to be performing the gesture if, at a particular time, more than a predetermined quantity of consecutive points that are aligned with the defined shape have a same sampled motion history data value.

As shown in a graph 520, a linear pattern may be recognized if sections of a graph are "connected". For example, the combining of graph sections 522 and 524 may result in a linear shape. Whether an otherwise linear graph appears as a disconnected graph may depend on which samples are plotted first. For example, a situation may occur where samples corresponding to the left side of an, inscribed circle are plotted first, while a circular gesture may have been performed with the user starting at the top of a circle. If, in graph 520, sample points starting with a point 526 are plotted first, followed by the remainder of the samples in section 524, followed by the samples in section 522, then the shape of the graph 520 may appear as and be recognized as a linear shape. As another example, a graph 530 includes stepped sections 532 and 534, and the graph 530 may be accepted as linear because if the section 532 is connected to the right hand side of the section 534, the resulting combined shape exhibits a generally linear pattern.

Figure 6:
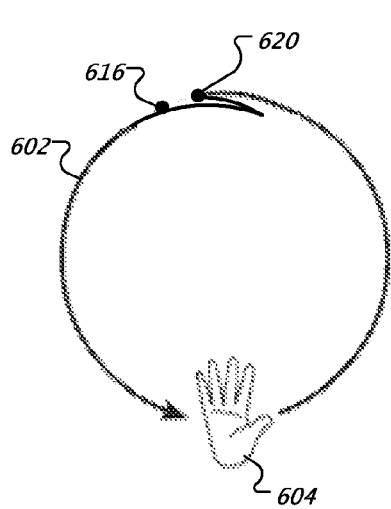
Figure 6:
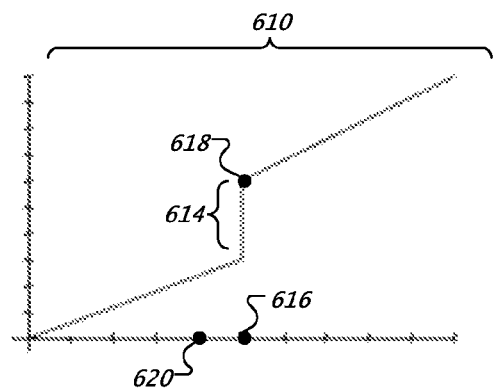
Figure 6:
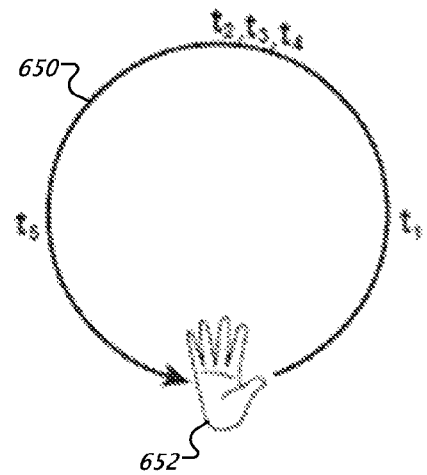
Figure 6:
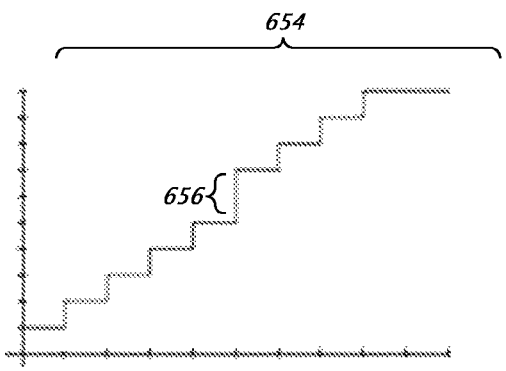

Because of body jitter, a user may rarely create a "perfect" shape (e.g., perfect circle) when making a gesture. Performed gestures that are close in shape to the shape of a defined gesture may be recognized. For example, shapes that are nearly circular may be recognized as a circular gesture. For example and as shown in FIG. 6, a user makes a gesture 602 with their hand 604. The gesture 602 is a nearly circular shape made in a counterclockwise direction, except that at the top of the gesture 602, the user "backtracks" in a clockwise direction, and then proceeds again counterclockwise, moving their hand 604 in a circular shape for the remainder of the gesture 602.

Plotting of motion history data values sampled along a circle inscribed in motion data corresponding to the gesture 602 may appear as a graph 610. The graph 610 appears generally linear except for a section 614. The section 614 corresponds to a jump from a sample point with a low value (such as sample point 620 located where the hand reversed direction) to an adjacent sample point with a higher value (such as sample point 616 located near the top of the inscribed circle) positioned shortly after the user resumed a counter-clockwise movement. A motion history data value 618 plotted on the graph 610 for the sample point 616 is much higher than the motion data value for sample point 620, and results in the "spike" in the shape of the graph 610. The "spike" is a result of the lapse in time that occurred when the user "backtracked" while gesturing. In other words, the spike illustrates the lapse in time between the sample point 616 and a sample point 620, where the sample point 620 corresponds to when the user began to "backtrack."

A "spike" may also occur in a graph if a user pauses during a gesture. For example, a user makes a circular gesture 650 with their hand 652. The user, however, pauses at the top of the circle before proceeding to complete the circular gesture 650 (i.e., the user completes a relatively large portion of the right hand side of the circular gesture 650 during a time point $t_1$, the user pauses near the top of the circular gesture during time points $t_2$, $t_3$, and $t_4$, and the user completes the remainder of the circular gesture 650 during a time point $t_5$).

A graph of sampled motion data corresponding to the circular gesture 650 may appear, for example, as a stepped graph 654. The graph 654 appears generally linear except for a "spike" in a section 656. The "spike" section 656 occurs as a result of the user pausing near the top of the circular gesture 650.

Gestures such as the gestures 602 and 650 may be accepted or rejected based, for example, upon a threshold of the height of one or more vertical spikes in an associated graph of sampled motion history data values. For example, if the height of the section 656 is less than a threshold, the gesture 650 may be accepted, while if the height of the section 614 exceeds a threshold, the gesture 602 may be rejected.

Figure 7:
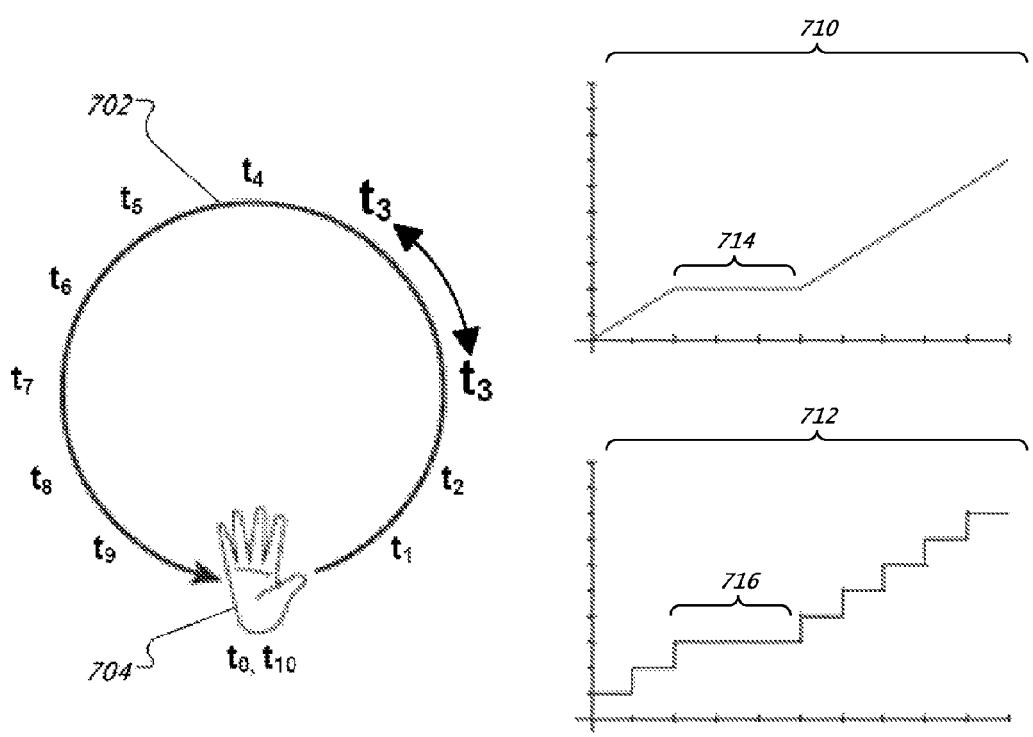

A graph may also be nearly linear except for a "plateau" section. For example, and as shown in FIG. 7, a user may make a circular gesture 702 with their hand 704. A graph of sampled motion data corresponding to the circular gesture 702 may appear, for example, as a graph 710 or as a stepped graph 712. The graph 710 appears generally linear except for a plateau section 714. Similarly, the stepped graph 712 appears generally linear except for a plateau section 716.

The plateau sections 714 and 716 may be caused by a user "speeding up" their motion during a gesture. For example, when making the gesture 702, the user may move at the same speed during time points $t_1$ through $t_2$. During a time point $t_3$, the user may speed up their motion, making the upper right portion of the gesture 702 during a single time point (i.e., the portion of the gesture 702 made during time point $t_3$ is significantly larger than portions made during other time points). The user may return to their initial speed to make the remainder of the gesture 702 during time points $t_4$ through $t_{10}$. The plateaus 714 and 716 may result because a number of sample points may have the same or nearly the same motion history data values due to the fast pace of movement during the time point $t_3$ (i.e., the recentness of motion detected in the areas of the motion history map corresponding to those sample points may be generally the same).

Gestures such as the gesture 702 may be accepted or rejected based, for example, upon a threshold of the length of one or more plateau sections in an associated graph of sampled motion history data values. For example, if the length of the section 714 is less than a threshold, the gesture 702 may be accepted. As another example, if the length of the section 716 exceeds a threshold, the gesture 702 may be rejected.

A defined gesture may be a single stroke shape. A gesture may represent an alphanumeric character (e.g., "O", "8") or some other symbol or function (e.g., the infinity symbol). Generally, a gesture is intended to refer to a movement, position, pose, or posture that expresses an idea, opinion, emotion, communication, command, demonstration or expression. A user may gesture while holding a hand-held device, or the user may gesture using one or more body parts while wearing a device on a part of their body. For instance, the user's gesture may be a single or multiple finger gesture; a single hand gesture; a single hand and arm gesture; a single hand and arm, and body gesture; a bimanual gesture; a head pose or posture; an eye position; a facial expression; a body pose or posture, or any other expressive body state.

A user's gesture may be expressive of an enabling or "engagement" gesture. The engagement gesture may be a specific hand pose or gesticulated hand motion sequence that is held for a predetermined amount of time. One example engagement gesture is the user holding a hand-held device immobile for three seconds. Another example is a circular hand motion made while holding a hand-held device by the user extending their arm in front of their face, and moving their arm in a circle in front of their head. As another example, an engagement gesture may be a user shaking a device. In essence, an engagement gesture specifies to a device that the user is ready for further input to occur. To reduce errors, an engagement gesture may be an atypical gesture, such as a gesture that would not subconsciously be made with body language during a normal conversation, or a gesture that would not be made in the ordinary performance of normal human activity.

A gesture may be derived that defines an idea, opinion, emotion, communication, command, demonstration or expression of the user. For instance, the user's gesture may be a single or multiple finger gesture; a single hand gesture; a single hand and arm gesture; a single hand and arm, and body gesture; a bimanual gesture; a change in head pose or posture; a change in an eye position; a change in a facial expression; a movement of a hand while holding a device; a change in a body pose or posture, or a transformation of any other expressive body state.

For brevity, the body part or parts used to perform relevant gestures are generally referred to as a "control object." For instance, the user may express a command using their entire body or with other physical objects, in which case their entire body or the other physical objects may be the control object. A user may more subtly express a command by blinking their eye, by flaring their nostrils, or by wiggling a finger, in which case the eyelid, nose, or finger, may be the control object. A control object may also be a physical device, such as an infrared finger light, a mobile device, a wrist-watch device, a retro-reflector, or a remote control, to name a few examples.

There are many ways of determining a user's gesture from motion data. For instance, the gesture of "drawing a circle in the air" or "swiping the hand off to one side" may be detected by a gesture analysis and detection process using the hand, arm, body, head or other object position information. Although the gesture may involve a two- or three-dimensional position displacement, such as when a swiping gesture is made, in other instances the gesture includes a transformation without a concomitant position displacement. For instance, if a hand is signaling "stop" with five outstretched fingers and palm forward, the gesture of the user changes if all five fingers are retracted into a ball with the palm remaining forward, even if the overall position of the hand or arm remains static.

Gestures may be detected using heuristic techniques, such as by determining whether hand or device position information passes explicit sets of rules. For example, the gesture of "swiping the hand off to one side" may be identified if the following gesture detection rules are satisfied: (1) the change in horizontal position is greater than a predefined distance over a time span that is less than a predefined limit; (2) the horizontal position changes monotonically over that time span; (3) the change in vertical position is less than a predefined distance over that time span; and (4) the position at the end of the time span is nearer to (or on) a border of the hand detection region than the position at the start of the time span.

Some gestures utilize multiple rule sets that are executed and satisfied in an explicit order, where the satisfaction of a rule set causes a system to change to a state where a different rule set is applied. This system may be unable to detect subtle gestures, in which case Hidden Markov Models may be used, as these models allow for chains of specific motions to be detected, but also consider the overall probability that the motions sufficiently fit a gesture.

So as to enable the input of complex commands and to increase the number of input options, the process for recognizing the user's gesture may further include recognizing a first displacement in a first direction, and recognizing a second displacement in a second direction, and aggregating these multiple displacements as a single gesture. Furthermore, the recognition of the user's gesture may determine a magnitude and direction of the user's gesture.

Returning to FIG. 3, if it is determined (or "if," "after," "when," or "in response to" determining that) the moving object has performed a gesture, an application is controlled (S308), thereby ending the process 300 (S310). To name a few examples, volume may be increased on a media player, an application may be launched, an application or a device may be shut down, or an email message may be sent. A function to perform in response to a gesture may be determined, for example, by querying a mapping database which maps gestures to functions.

Figure 8:
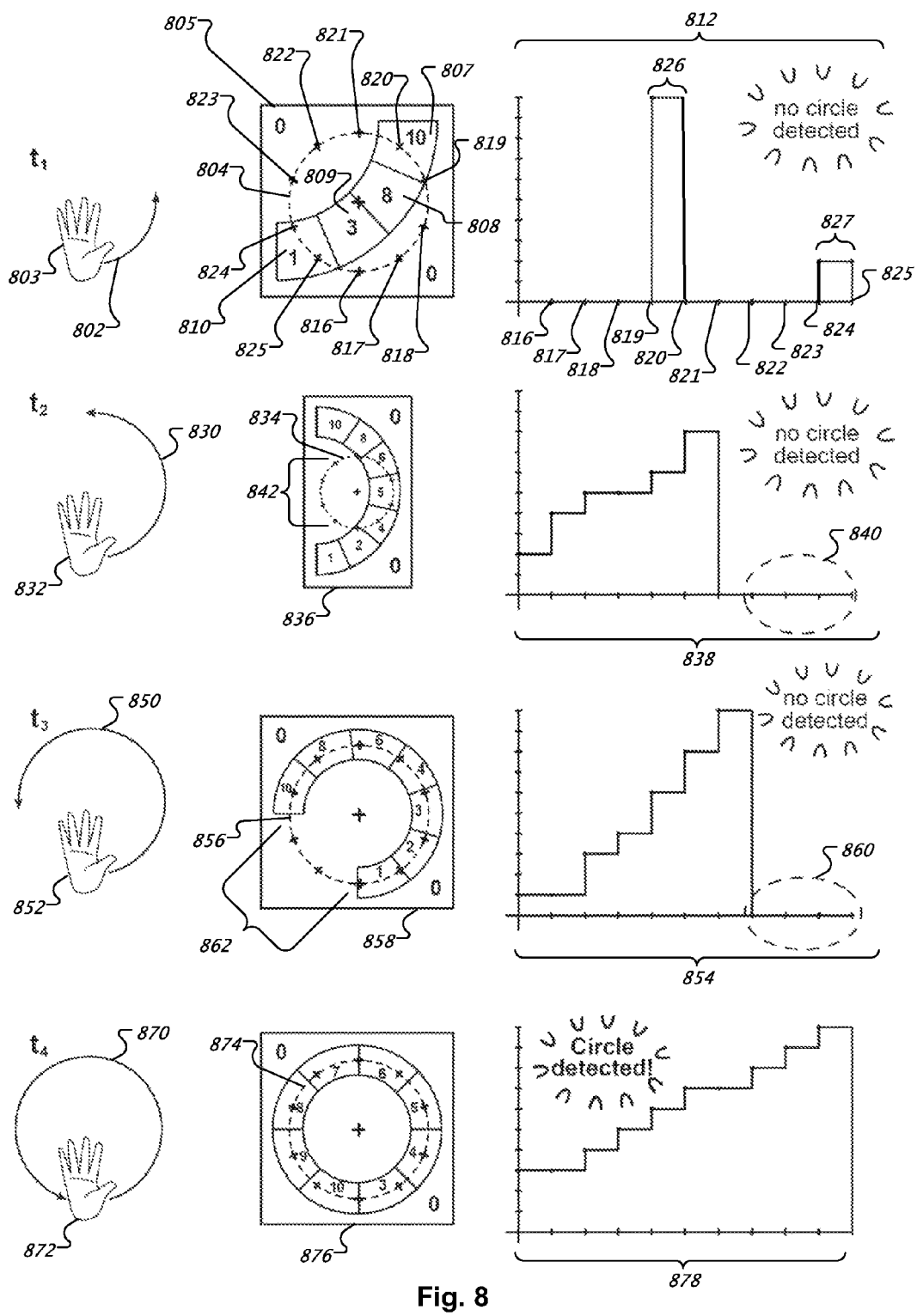
FIG. 8 illustrates gesture acceptance and rejection.

FIG. 8 illustrates graphs of motion history data values. For example, during a time point $t_1$, a user makes a quarter-circle gesture 802 using their hand 803, starting from a "6 o'clock" position and ending at a "3 o'clock" position. A circle 804 has been inscribed in a motion history map 805 associated with the gesture 802. The motion history map 805 includes a region 807 which includes the most recent motion data history values, and regions 808-810 which include less-recent motion history data values.

A graph 812 illustrates the plotting of sampled motion history data values aligned with the inscribed circle 804. For example, sample points 816-825 have been plotted. Sample points 816-818 fall outside of the regions 807-810 which include detected motion, therefore the sample points 816-818 have motion history data values of "0" (i.e., no detected motion). Sample points 819-820 have motion history data values of "10" (i.e., most recent detected motion), resulting in a spike in the graph 812 in a section 826. Sample points 821-823 fall outside of the regions 807-810 which include detected motion, therefore the sample points 821-823 have motion history data values of "0." Sample points 824-825 fall within the region 810, therefore the sample points 824-825 have motion history data values of "1," resulting in a small spike in the graph 812 in a section 827. Because the non-linear shape of the graph 812 does not match the expected linear shape associated with a circular gesture, a circular gesture is not detected (e.g. is actively "rejected") in response to the performance of the gesture 802.

If a user makes a semi-circle gesture 830 with their hand 832 (i.e., by making a quarter-circle gesture at a time point $t_1$, and completing the semi-circle gesture 830 at a time point $t_2$), a circle 834 may be inscribed in a motion history map 836 associated with the gesture 830, and points sampled along the inscribed circle 834 may be plotted on a graph 838. The shape of the graph 838 may be considered non-linear due to a section 840 of zero-values on the right hand side of the graph 838.

The section 840 of zero-values corresponds to samples taken on a left-hand side section 842 of the inscribed circle 834. The samples in the section 842 fall outside of regions of the motion history map 836 that include detected motion. Although the initial (i.e., left-hand side) portion of the graph 838 may be considered linear, the entire graph 838 may be considered non-linear due to the graph section 840, thereby resulting in the non-detection of a circular gesture.

Similarly, a three-quarter-circle gesture 850 made with a hand 852 (i.e., by making a quarter-circle gesture at a time point $t_1$, completing a semi-circle gesture at a time point $t_2$, and completing a three-quarter-circle gesture at a time point $t_3$) may be rejected as a circular gesture due to the non-linear shape of an associated graph 854. The graph 854 illustrates the plotting of points sampled along a circle 856 inscribed in a motion history map 858. The graph 854 may be considered non-linear due to a section 860 of zero values on the right-hand side of the graph 854. The graph section 860 corresponds to samples taken along a section 862 of the inscribed circle 856. The gesture 850 may be rejected as a circular gesture if the length of the section 860 exceeds a threshold, but may be accepted as a circular gesture if the length of the section 860 is less than a threshold.

If a user makes a full-circle gesture 870 with their hand 872 (i.e., by making a quarter-circle gesture at a time point $t_1$, completing a semi-circle gesture at a time point $t_2$, completing a three-quarter-circle gesture at a time point $t_3$, and completing the full-circle gesture 870 at a time point $t_4$), a circle 874 may be inscribed in a motion history map 876 associated with the gesture 870, and points sampled along the inscribed circle 874 may be plotted on a graph 878.

The points sampled along the inscribed circle 874 are plotted such that the samples corresponding to the user's oldest detected movement (i.e. the minimum motion history values) are plotted on the one side of the graph 878 and the samples corresponding to the user's most recent detected movement is plotted on the opposite side of the graph 878. In this regard, as a preparatory operation to plotting the motion history data, the minimum motion history value can be determined and the sampling point associated with that value can be assigned to the origin of the graph. The graph 878 exhibits a generally linear shape since the more recent sample points have greater (i.e., more recent) motion history data values. The performance of a circular gesture may be detected due to the linear shape of the graph 878.

Figure 9:
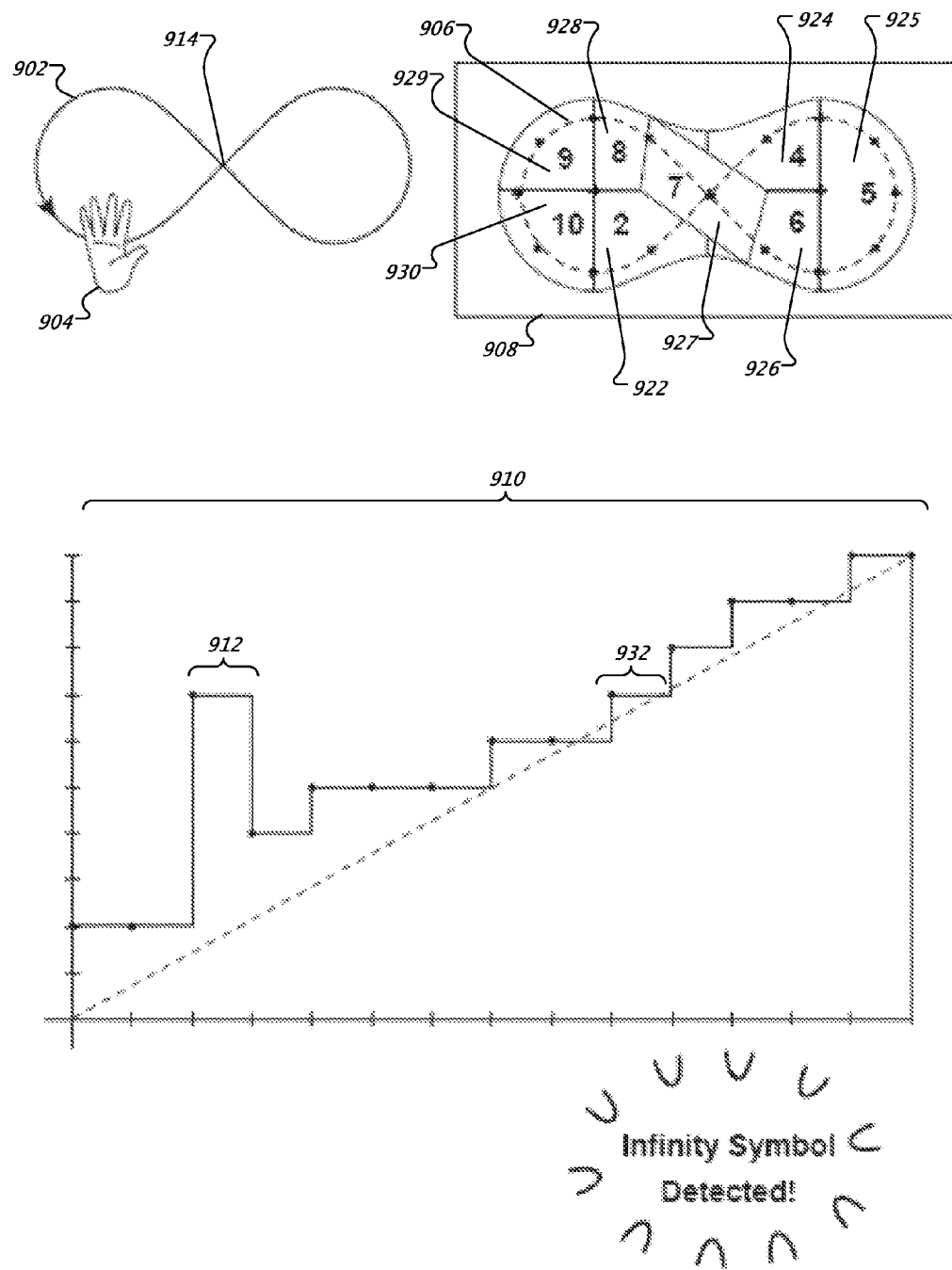
FIG. 9 illustrates an example repeatable gesture.

Gestures other than circular gestures may be detected. For example, and as shown in FIG. 9, an "infinity symbol" gesture 902 may be detected. Gestures such as the gesture 902, a circle gesture, a "figure eight" gesture, and other connected gestures may be performed repeatedly by a user. Such gestures may be made using continuous, connected motions (in contrast to a disconnected shape, such as a "T" character). A user may repeatedly perform the gesture 902 or another connected gesture to have a mapped function (e.g., volume raising) repeated (e.g., to have the volume raised louder and louder). As another example, a user may repeat a gesture until the gesture is recognized (e.g., a gesture might not be initially recognized due to the user not performing the gesture accurately, and/or a gesture may not be always recognized during a period where a device is being trained to recognize a particular user's gestures).

If a user performs the gesture 902 using a hand 904, an infinity symbol shape 906 may be inscribed in a motion history map 908 associated with the gesture 902. Points may be sampled along the shape 906 and motion history data values for the sampled points may be plotted on a graph 910.

The graph 910 exhibits a generally linear shape, except for a spike occurring in a section 912. The spike occurs due to a "cross-over" point 914 in the gesture 902. Sample points plotted on the graph 910 fall within regions 922-930 of the motion history map 908. The graph 910 exhibits a linear shape for sample points which fall within regions 924-930 (i.e., the section of the graph to the right of the spike 912). Regions 924-930 correspond to user motion after the cross-over point 914 to the end of the gesture 902.

A graph section 932 includes motion history data values plotted for sample points occurring in the region 927. The region 927 corresponds to the cross-over point 914. More particularly, the values plotted in graph section 932 correspond to the latest user motion occurring in the region 927. When performing the gesture 902, the user initially moved from a region 922 to the region 927, then to the regions 924-926, and then back again to the region 927, and then to the regions 928-930. The second movement through the region 927, in a sense, "overwrote" the previous motion history data for the first movement through the region 927 (i.e., the motion history map indicates the last detected motion). In an alternate implementation, motion history values for particular points are not overwritten, but rather multiple motion history values may be assigned to a single point based on subsequent motion over that point.

The data corresponding to section 912, therefore, is, in a sense, duplicate information as that found in section 932. For a defined infinity symbol gesture, a defined expected pattern may include a spike such as the spike exhibited in section 912. If, taking a spike into account, a graph associated with a performed infinity symbol gesture 902 exhibits an otherwise linear shape, the performed gesture 902 may be detected and an application may be controlled (e.g., volume raised on a device) in response to detecting the gesture 902.

Figure 10:
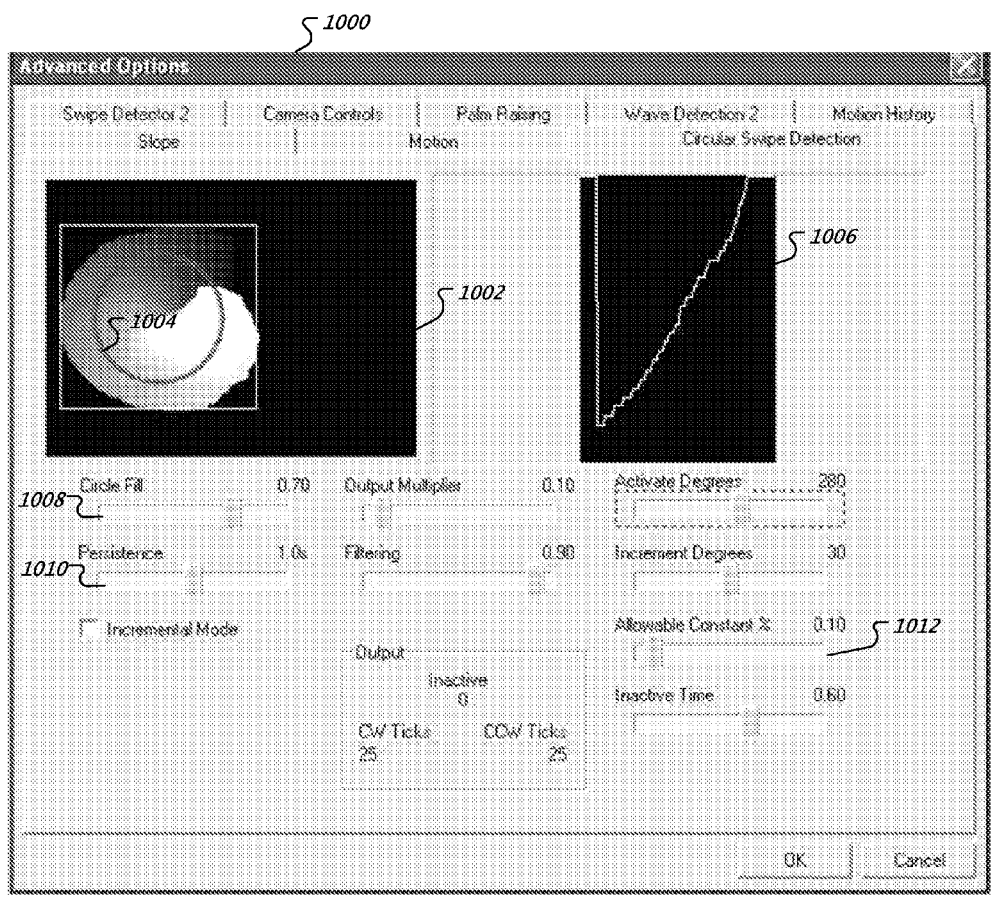
FIGS. 10-14 illustrate example user interfaces.

FIG. 10 is a user interface 1000 including a motion history map 1002 associated with a performed circular gesture. A circle 1004 is inscribed inside of a bounding box which surrounds points indicating detected motion. A graph 1006 displays motion history data values of points sampled along the inscribed circle 1004. The shape of the graph 1006 is linear, indicating that the corresponding performed circle gesture is recognized as a circular gesture.

The user interface 1000 includes controls which may be used for configuring gesture detection. For example, a control 1008 may be used to define a percentage of a bounding box's minimum dimension which may be used as a diameter size of an inscribed circle. A control 1010 may be used to define a persistence value which controls the length of time before motion history values decay. As another example, a control 1012 may be used to define a percentage value which controls a percentage of the motion history values that may be constant for a circular gesture to be detected.

Figure 11:
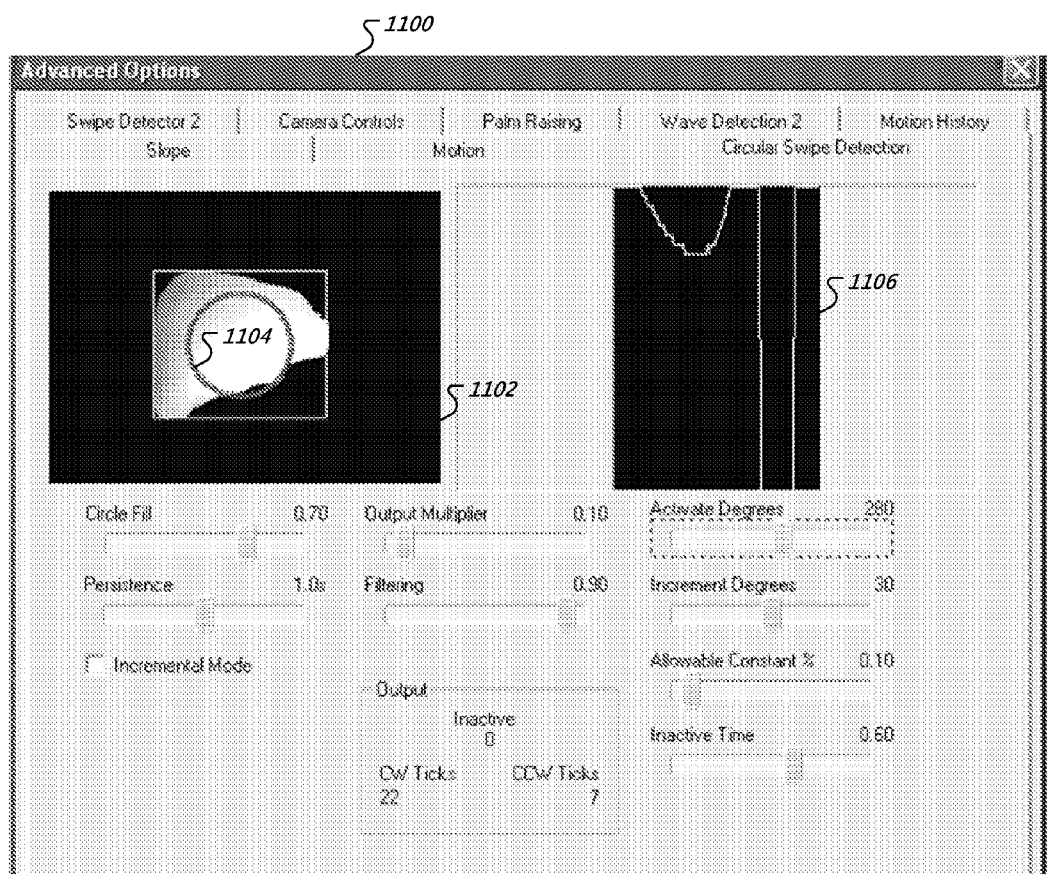

FIG. 11 is a user interface 1100 including a motion history map 1102 associated with a performed quarter-circle gesture. A circle 1104 is inscribed inside of a bounding box which surrounds points indicating detected motion. A graph 1106 displays motion history data values of points sampled along the inscribed circle 1104. The shape of the graph 1106 is not linear, indicating that the corresponding performed quarter-circle gesture is not recognized as a circular gesture.

Figure 12:
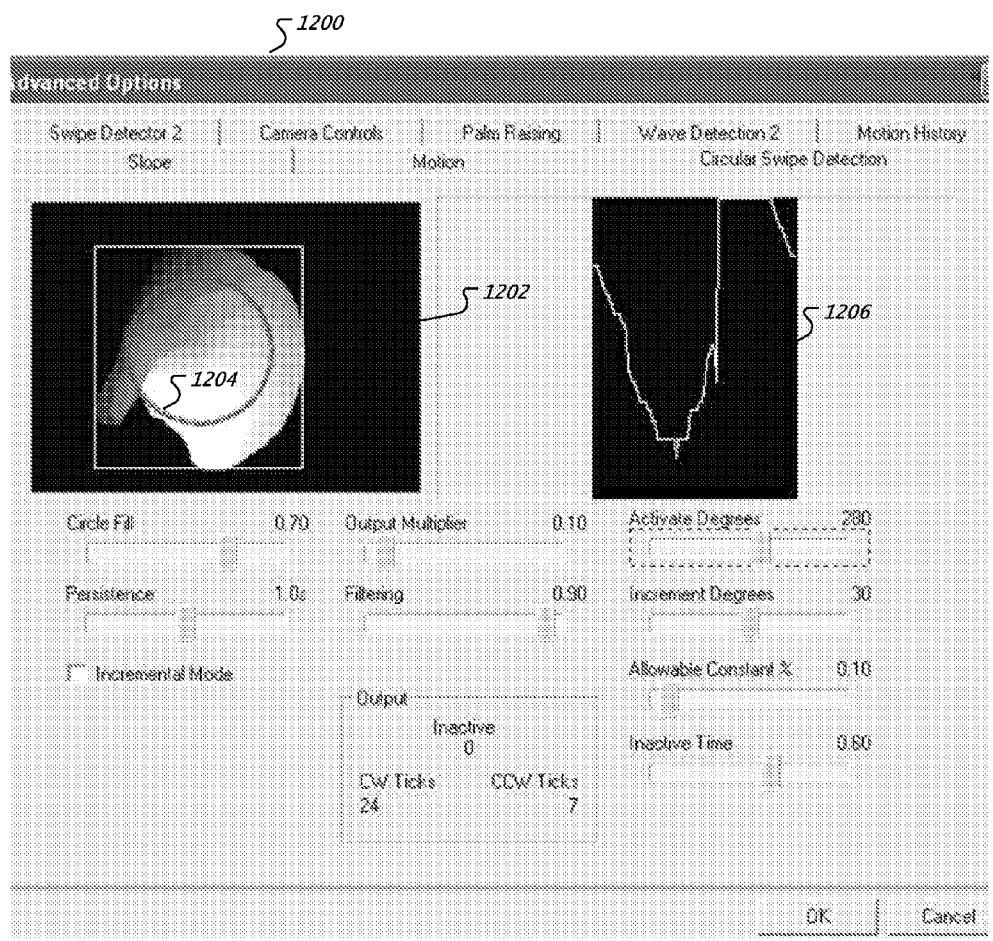

FIG. 12 is a user interface 1200 including a motion history map 1202 associated with a performed half-circle gesture. A circle 1204 is inscribed inside of a bounding box which surrounds points indicating detected motion. A graph 1206 displays motion history data values of points sampled along the inscribed circle 1204. The shape of the graph 1206 is not linear, indicating that the corresponding performed quarter-circle gesture is not recognized as a circular gesture.

Figure 13:
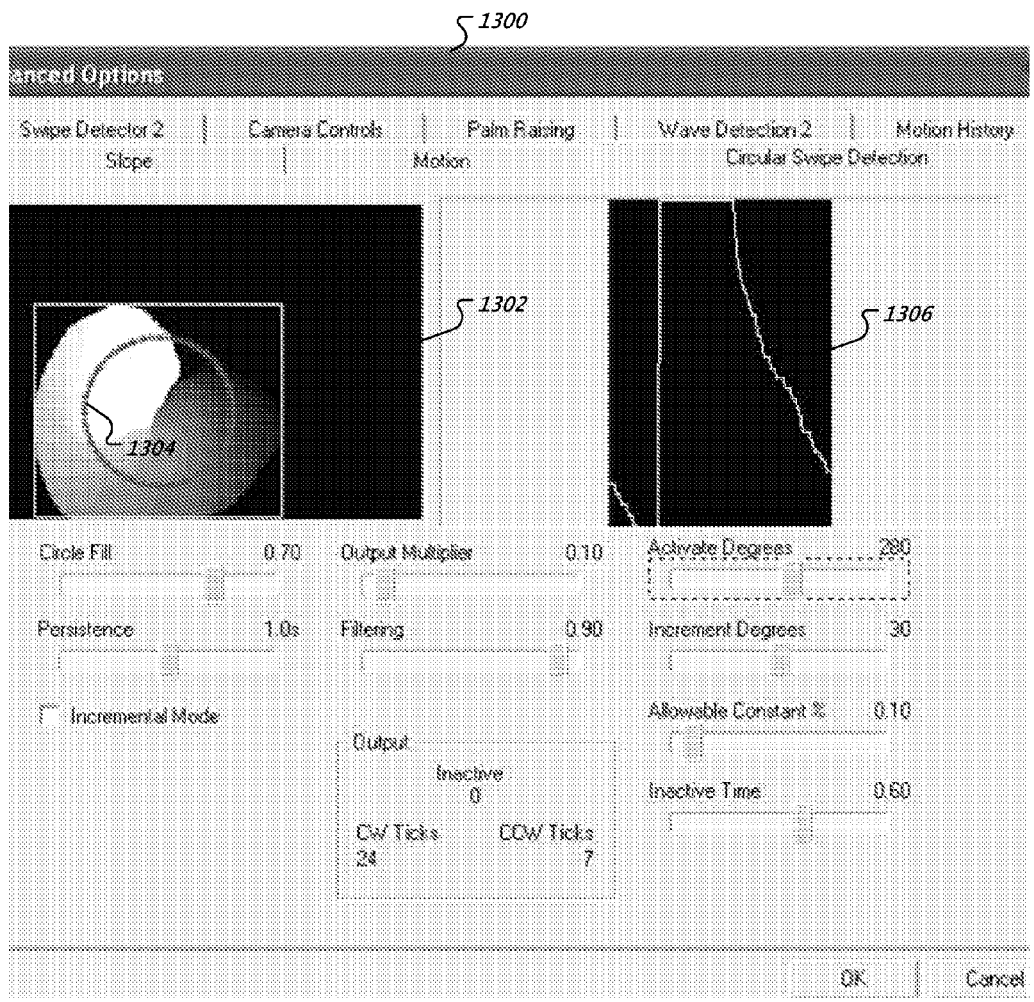

FIG. 13 is a user interface 1300 including a motion history map 1302 associated with a performed three-quarter-circle gesture. A circle 1304 is inscribed inside of a bounding box which surrounds points indicating detected motion. A graph 1306 displays motion history data values of points sampled along the inscribed circle 1304. The shape of the graph 1306 is close to linear. If the sloped, leftmost portion of the graph 1306 is connected to the sloped, rightmost portion of the graph 1306, a linear shape would be exhibited, except for a plateau section at the top. Whether the performed three-quarter gesture corresponding to the graph 1306 is accepted or rejected may depend on defined thresholds.

Figure 14:
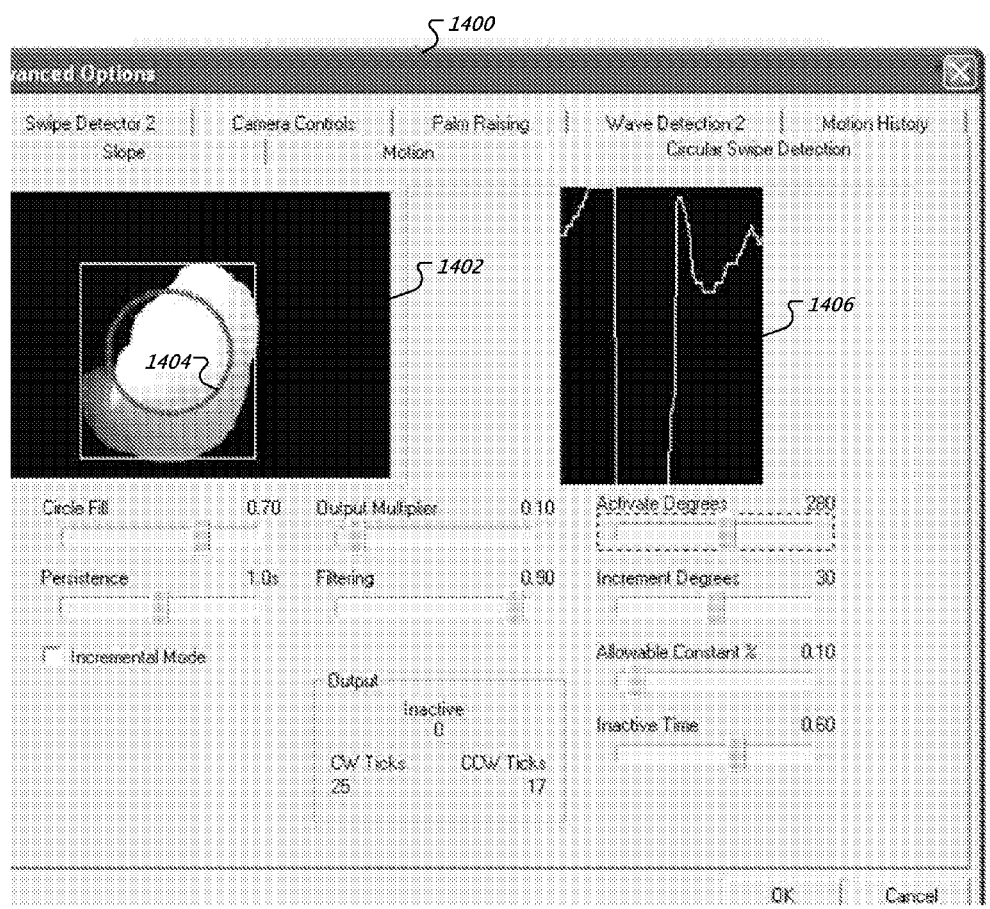

FIG. 14 is a user interface 1400 including a motion history map 1402 associated with a performed gesture. The associated gesture was performed in a clockwise direction (in contrast, performed gestures corresponding to user interfaces 1000, 1100, 1200, and 1300 were performed in a counter-clockwise direction). A circle 1404 is inscribed inside of a bounding box which surrounds points indicating detected motion. A graph 1406 displays motion history data values of points sampled along the inscribed circle 1404. The shape of the graph 1406 is not linear, indicating that the corresponding performed gesture is not recognized as a circular gesture.

Figure 15:
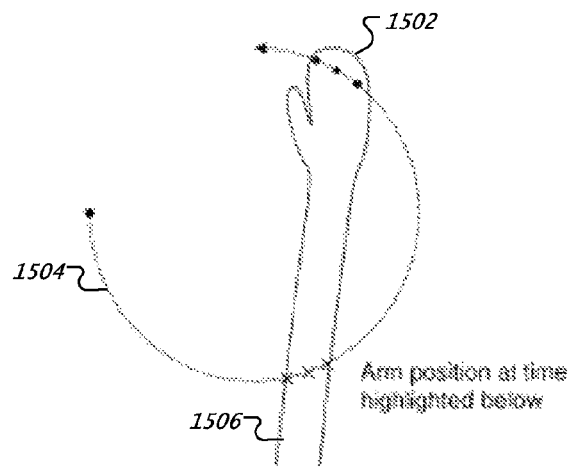
FIGS. 15-16 illustrate motion history corresponding to arm movement.

When a user performs a gesture using their hand, movement of their arm and/or wrist may show up in associated motion history maps. For example, and as shown in FIG. 15, as a user gestures with a hand 1502 in a circular gesture 1504, the user's arm 1506 may cross the previous path of movement of the hand 1502.

Figure 16:
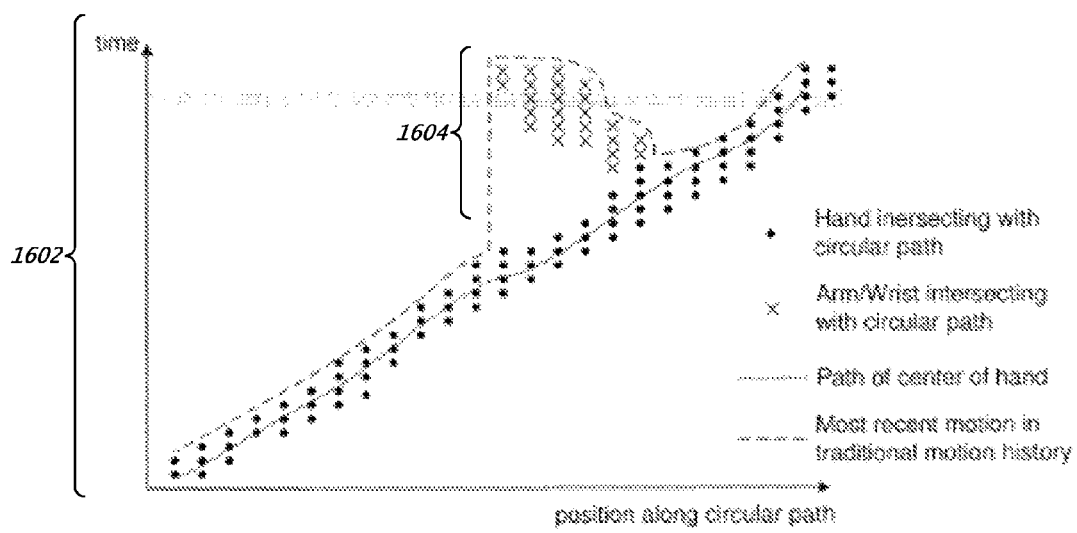

FIG. 16 is an example graph 1602 of motion history data values corresponding to the gesture 1502. As shown in FIG. 16, the motion history data values corresponding to the movement of the hand 1502 largely exhibit a linear pattern. However, motion history data values corresponding to motion detected when the arm 1506 crosses the circular path previously performed by the hand 1502, a "spike" occurs in the graph 1602 in a section 1604. In order to successfully detect circular gestures, detected movement of the arm 1506 may need to be ignored or otherwise taken into account.

Figure 17:
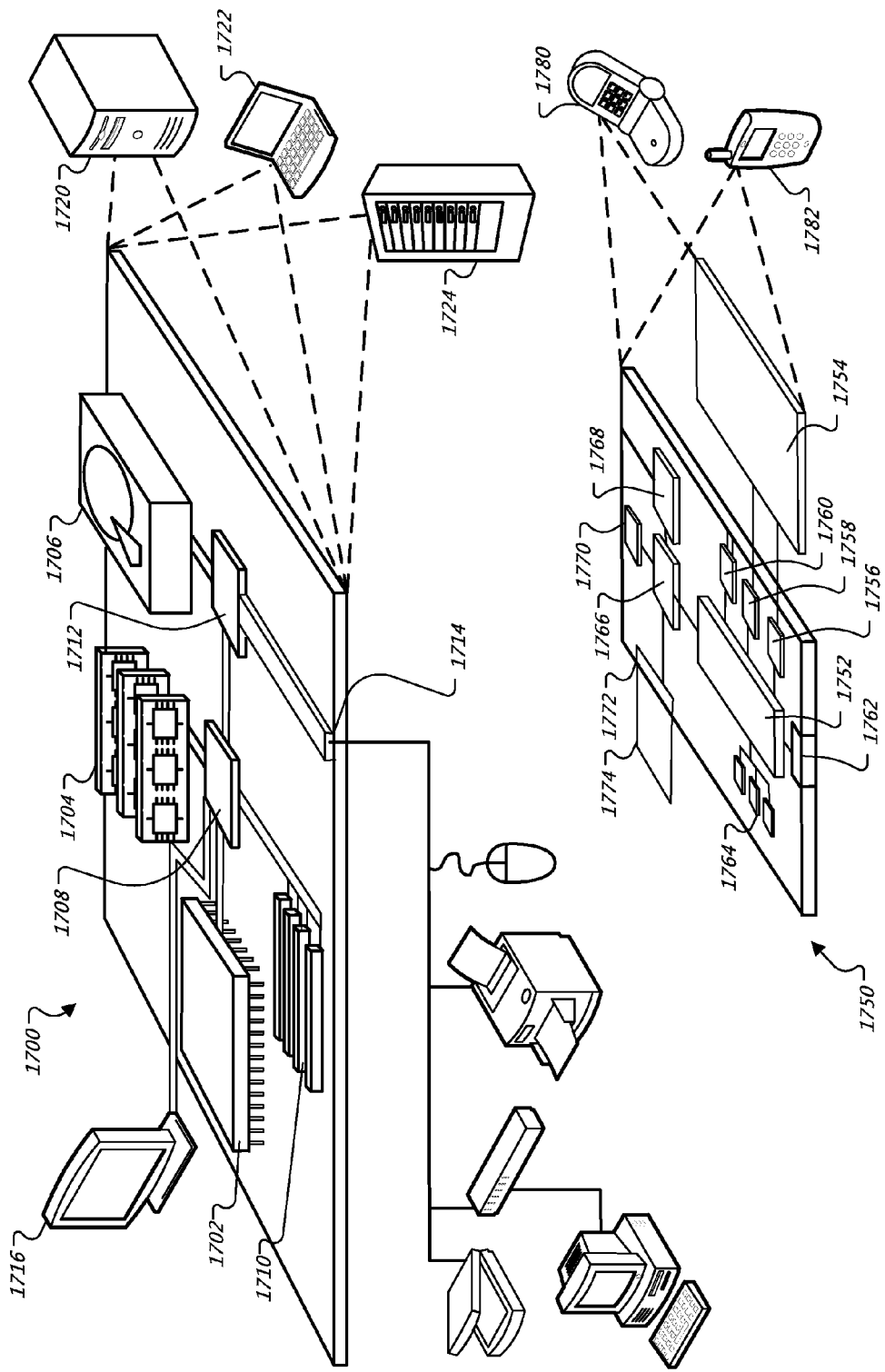
FIG. 17 illustrates exemplary computing devices.
Like reference numbers represent corresponding parts throughout.

FIG. 17 is a block diagram of computing devices 1700, 1750 that may be used to implement the systems and methods described in this document, as either a client or as a server or plurality of servers. Computing device 1700 is intended to represent various forms of digital computers, such as laptops, desktops, workstations, personal digital assistants, servers, blade servers, mainframes, and other appropriate computers. Computing device 1750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the approaches described and/or claimed in this document.

Computing device 1700 includes a processor 1702, memory 1704, a storage device 1706, a high-speed interface 1708 connecting to memory 1704 and high-speed expansion ports 1710, and a low speed interface 1712 connecting to low speed bus 1714 and storage device 1706. Each of the components 1702, 1704, 1706, 1708, 1710, and 1712, are interconnected using various busses, and may be mounted on a common motherboard or in other manners as appropriate. The processor 1702 may process instructions for execution within the computing device 1700, including instructions stored in the memory 1704 or on the storage device 1706 to display graphical information for a GUI on an external input/output device, such as display 1716 coupled to high speed interface 1708. In other implementations, multiple processors and/or multiple busses may be used, as appropriate, along with multiple memories and types of memory. Also, multiple computing devices 1700 may be connected, with each device providing portions of the necessary operations (e.g., as a server bank, a group of blade servers, or a multi-processor system).

The memory 1704 stores information within the computing device 1700. In one implementation, the memory 1704 is a computer-readable medium. In one implementation, the memory 1704 is a volatile memory unit or units. In another implementation, the memory 1704 is a non-volatile memory unit or units.

The storage device 1706 is capable of providing mass storage for the computing device 1700. In one implementation, the storage device 1706 is a computer-readable medium. In various different implementations, the storage device 1706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1704, the storage device 1706, memory on processor 1702.

The high speed controller 1708 manages bandwidth-intensive operations for the computing device 1700, while the low speed controller 1712 manages lower bandwidth-intensive operations. Such allocation of duties is exemplary only. In one implementation, the high-speed controller 1708 is coupled to memory 1704, display 1716 (e.g., through a graphics processor or accelerator), and to high-speed expansion ports 1710, which may accept various expansion cards (not shown). In the implementation, low-speed controller 1712 is coupled to storage device 1706 and low-speed expansion port 1714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1700 may be implemented in a number of different forms, as shown in the figure. For example, it may be implemented as a standard server 1720, or multiple times in a group of such servers. It may also be implemented as part of a rack server system 1724. In addition, it may be implemented in a personal computer such as a laptop computer 1722. Alternatively, components from computing device 1700 may be combined with other components in a mobile device (not shown), such as device 1750. Each of such devices may contain one or more of computing devices 1700, 1750, and an entire system may be made up of multiple computing devices 1700, 1750 communicating with each other. The computing device 1700 may include one or more sensors (not shown), such as gyroscopes, cameras or GPS (Global Positioning Satellite) trackers, configured to detect or sense motion or position of the computing device 1700.

Computing device 1750 includes a processor 1752, memory 1764, an input/output device such as a display 1754, a communication interface 1766, and a transceiver 1768, among other components. The device 1750 may also be provided with a storage device, such as a microdrive or other device, to provide additional storage. Each of the components

1750, 1752, 1764, 1754, 1766, and 1768, are interconnected using various busses, and several of the components may be mounted on a common motherboard or in other manners as appropriate. The computing device 1750 may include one or more sensors (not shown), such as gyroscopes, cameras or GPS (Global Positioning Satellite) trackers, configured to detect or sense motion or position of the computing device 1700.

The processor 1752 may process instructions for execution within the computing device 1750, including instructions stored in the memory 1764. The processor may also include separate analog and digital processors. The processor may provide, for example, for coordination of the other components of the device 1750, such as control of user interfaces, applications run by device 1750, and wireless communication by device 1750.

Processor 1752 may communicate with a user through control interface 1758 and display interface 1756 coupled to a display 1754. The display 1754 may be, for example, a TFT LCD display or an OLED display, or other appropriate display technology. The display interface 1756 may comprise appropriate circuitry for driving the display 1754 to present graphical and other information to a user. The control interface 1758 may receive commands from a user and convert them for submission to the processor 1752. In addition, an external interface 1762 may be provided in communication with processor 1752, so as to enable near area communication of device 1750 with other devices. External interface 1762 may provide, for example, for wired communication (e.g., via a docking procedure) or for wireless communication (e.g., via Bluetooth or other such technologies).

The memory 1764 stores information within the computing device 1750. In one implementation, the memory 1764 is a computer-readable medium. In one implementation, the memory 1764 is a volatile memory unit or units. In another implementation, the memory 1764 is a non-volatile memory unit or units. Expansion memory 1774 may also be provided and connected to device 1750 through expansion interface 1772, which may include, for example, a SIMM card interface. Such expansion memory 1774 may provide extra storage space for device 1750, or may also store applications or other information for device 1750. Specifically, expansion memory 1774 may include instructions to carry out or supplement the processes described above, and may include secure information also. Thus, for example, expansion memory 1774 may be provide as a security module for device 1750, and may be programmed with instructions that permit secure use of device 1750. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1764, expansion memory 1774, or memory on processor 1752.

Device 1750 may communicate wirelessly through communication interface 1766, which may include digital signal processing circuitry where necessary. Communication interface 1766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1768. In addition, short-range communication may occur, such as using a Bluetooth, WiFi, or other such transceiver (not shown). In addition, GPS receiver module 1770 may provide additional wireless data to device 1750, which may be used as appropriate by applications running on device 1750.

Device 1750 may also communicate audibly using audio codec 1760, which may receive spoken information from a user and convert it to usable digital information. Audio codec 1760 may likewise generate audible sound for a user, such as through a speaker, e.g., in a handset of device 1750. Such sound may include sound from voice telephone calls, may include recorded sound (e.g., voice messages, music files, etc.) and may also include sound generated by applications operating on device 1750.

The computing device 1750 may be implemented in a number of different forms, as shown in the figure. For example, it may be implemented as a cellular telephone 1780. It may also be implemented as part of a smartphone 1782, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the systems and techniques described here), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method, comprising:
    receiving motion data, wherein the motion data comprises multiple images captured of an object over a period of time;
    generating a motion history map from the received motion data;
    defining a plurality of points within the motion history map, wherein:
        each point of the plurality of points corresponds to a point in time,
        the plurality of points are positioned within the motion history map and aligned with a shape stored prior to when the multiple images are captured, the shape inscribed within the boundaries of the motion data, and
        a quantity of the plurality of points is based, at least in part, on a size of the shape;
    sampling the motion history map at the plurality of points;
    determining that the object is performing a gesture corresponding to the shape based on the sampled motion history map by, for each point of the plurality of points, comparing a time associated with the sampled motion history map at that point with an expected time for that point; and
    controlling an application at least partially based on determining that the object is performing the gesture.

2. The computer-implemented method of claim 1, wherein the determining is based on a relative time at which motion occurred at each of the plurality of points.

3. The computer-implemented method of claim 1, wherein samples of the sampled motion history map are distributed among a plurality of regions of the motion history map according to how recently detected motion occurred at each of the samples, and wherein the determining is based on a sequence of the regions in which the samples are distributed.

4. The computer-implemented method of claim 1, wherein:
    the motion history map comprises motion history data values that provide an indication of time since the object was detected at each of multiple points.

5. The computer-implemented method of claim 4, wherein generating the motion history map from the received motion data comprises:
    accessing each image of the multiple images; and
    generating the motion history map based on the accessed images.

6. The computer-implemented method of claim 4, wherein:
    the determining that the object is performing the gesture corresponding to the shape based on the sampled motion history map is based on a pattern exhibited by the sampled motion history map; and
    the pattern comprises an upward or downward sloping shape on a graph of the motion history data values for consecutive points that correspond to the shape.

7. The computer-implemented method of claim 4, wherein:
    the determining that the object is performing the gesture corresponding to the shape based on the sampled motion history map is based on a pattern exhibited by the sampled motion history map, and
    the pattern comprises an upward or downward stepped shape on a graph of the motion history data values for consecutive points that correspond to the shape.

8. The computer-implemented method of claim 4, wherein generating the motion history map from the received motion data comprises determining, for each point of the multiple points, whether the object has been detected within a predetermined period of time and grouping adjacent points determined to have detected motion of the object within the predetermined period of time; and
    wherein the motion history map is sampled at a subset of the grouped points that are aligned with the shape.

9. The computer-implemented method of claim 8, wherein the plurality of points are sampled such that a center of the shape corresponds to a centroid, a center of mass, or a median pixel of the grouped points.

10. The computer-implemented method of claim 8, further comprising:
    defining a bounding box around the grouped points in the motion history map, wherein
        the size and a location of the shape defined by the plurality of points within the motion history map are defined with respect to the bounding box.

11. The computer-implemented method of claim 10, wherein
    the shape comprises a circle, and
    a diameter of the circle is less than a smaller dimension of the bounding box.

12. The computer-implemented method of claim 10, wherein
    a center of the shape is aligned within the bounding box according to a function of a dimension or an aspect ratio of the bounding box.

13. The computer-implemented method of claim 1, wherein the shape comprises a circle shape, a figure-eight-shape, or an infinity-shape.

14. A system comprising:
    a processor; and
    a memory communicatively coupled with and readable by the processor and having stored therein processor-readable instructions which, when executed by the processor, cause the processor to:
        receive motion data, wherein the motion data comprises multiple images captured of an object over a period of time;
        generate a motion history map from the received motion data;
        define a plurality of points within the motion history map, wherein:
            each point of the plurality of points corresponds to a point in time,
            the plurality of points are positioned within the motion history map and aligned with a shape stored prior to when the multiple images are captured, the shape inscribed within the boundaries of the motion data, and a quantity of the plurality of points is based, at least in part, on a size of the shape;
sample the motion history map at the plurality of points;
determine that the object is performing a gesture correlated to the shape based on the sampled motion history map by, for each point of the plurality of points, comparing a time associated with the sampled motion history map at that point with an expected time for that point: and
control an application at least partially based on determining that the object is performing the gesture.

15. The system of claim 14, wherein the processor-readable instructions which cause the processor to determine that the object is performing the gesture correlated to the shape based on the sampled motion history map is based on a relative time at which motion occurred at each of the plurality of points.

16. The system of claim 14, wherein:
samples of the sampled motion history map are distributed among a plurality of regions of the motion history map according to how recently detected motion occurred at each of the samples, and
the processor-readable instructions which cause the processor to determine that the object is performing the gesture correlated to the shape based on the sampled motion history map is based on a sequence of the regions in which the samples are distributed.

17. The system of claim 14, wherein:
the motion history map comprises motion history data values that provide, for multiple points, an indication of time since the object was detected at each of the multiple points.

18. The system of claim 17, wherein the processor-readable instructions which, when executed by the processor, cause the processor to generate the motion history map from the received motion data, include instructions for:
accessing the multiple images; and
generating the motion history map based on the accessed images.

19. The system of claim 17, wherein:
the processor-readable instructions that cause the processor to determine that the object is performing the gesture corresponding to the shape based on the sampled motion history map is further based on a pattern exhibited by the sampled motion history map; and
the pattern comprises an upward or downward sloping shape on a graph of the motion history data values for consecutive points that are aligned with the shape.

20. The system of claim 17, wherein:
the processor-readable instructions that cause the processor to determine that the object is performing the gesture corresponding to the shape based on the sampled motion history map is further based on a pattern exhibited by the sampled motion history map; and
the pattern comprises an upward or downward stepped shape on a graph of the motion history data values for consecutive points that are aligned with the shape.

21. The system of claim 17, wherein the processor-readable instructions which, when executed by the processor, cause the processor to generate the motion history map from the received motion data, include instructions for:
determining, for each point of the multiple points, whether the object has been detected within a predetermined period of time; and
grouping adjacent points determined to have detected motion of the object within the predetermined period of time, wherein
the motion history map is sampled at a subset of the grouped points that are aligned with the shape.

22. The system of claim 21, wherein the plurality of points are sampled such that a center of the shape corresponds to a centroid, a center of mass, or a median pixel of the grouped points.

23. The system of claim 21, further comprising processor-readable instructions which, when executed by the processor, cause the processor to:
define a bounding box around the grouped points in the motion history map, wherein the size and a location of the shape defined by the plurality of points within the motion history map are defined with respect to the bounding box.

24. The system of claim 23, wherein:
the shape comprises a circle, and
a diameter of the circle is less than a smaller dimension of the bounding box.

25. The system of claim 23, wherein a center of the shape is aligned within the bounding box according to a function of a dimension or an aspect ratio of the bounding box.

26. The system of claim 14, wherein the shape comprises a circle shape, a figure-eight-shape, or an infinity-shape.

27. An apparatus comprising:
means for receiving motion data, wherein
the motion data comprises multiple images captured of an object over a period of time;
means for generating a motion history map from the received motion data;
means for defining a plurality of points within the motion history map, wherein:
each point of the plurality of points corresponds to a point in time,
the plurality of points are positioned within the motion history map and aligned with a shape stored prior to when the multiple images are captured, the shape inscribed within the boundaries of the motion data, and
a quantity of the plurality of points is based, at least in part, on a size of the shape;
means for sampling the motion history map at the plurality of points;
means for determining that the object is performing a gesture corresponding to the shape based on the sampled motion history map by, for each point of the plurality of points, comparing a time associated with the sampled motion history map at that point with an expected time for that point: and
means for controlling an application at least partially based on determining that the object is performing the gesture.

28. The apparatus of claim 27, wherein
the means for determining that the object is performing the gesture uses a relative time at which motion occurred at each of the plurality of points.

29. The apparatus of claim 27, wherein
samples of the sampled motion history map are distributed among a plurality of regions of the motion history map according to how recently detected motion occurred at each of the samples, and wherein the means for determining is based on a sequence of the regions in which the samples are distributed.

30. The apparatus of claim 27, wherein:
the motion history map comprises motion history data values that provide an indication of time since the object was detected at multiple points.

31. A non-transitory computer-readable storage medium encoded with processor-readable instructions that, when executed, cause a processing device to perform operations comprising:
- receiving motion data, wherein the motion data comprises multiple images captured of an object over a period of time;
- generating a motion history map from the received motion data;
- defining a plurality of points within the motion history map, wherein:
  - each point of the plurality of points corresponds to a point in time,
  - the plurality of points are positioned within the motion history map and aligned with a shape stored prior to when the multiple images are captured, the shape inscribed within the boundaries of the motion data, and
  - a quantity of the plurality of points is based, at least in part, on a size of the shape;
- sampling the motion history map at the plurality of points;
- determining that the object is performing a gesture corresponding to the shape based on the sampled motion history map by, for each point of the plurality of points, comparing a time associated with the sampled motion history map at that point with an expected time for that point: and
- controlling an application at least partially based on determining that the object is performing the gesture.

* * * * *